United States Patent
Ahmed

(10) Patent No.: US 12,556,463 B2
(45) Date of Patent: Feb. 17, 2026

(54) NORMALIZING A TREND DEVIATION-BASED QUANTITATIVE KEY PERFORMANCE INDICTOR (KPI)

(71) Applicant: Rakuten Symphony, Inc., Tokyo (JP)

(72) Inventor: Tasnim Ahmed, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/639,972

(22) Filed: Apr. 19, 2024

(65) Prior Publication Data

US 2025/0330396 A1 Oct. 23, 2025

(51) Int. Cl.
*H04L 41/5009* (2022.01)
*H04L 41/16* (2022.01)

(52) U.S. Cl.
CPC .......... *H04L 41/5009* (2013.01); *H04L 41/16* (2013.01)

(58) Field of Classification Search
CPC ............................ H04L 41/5009; H04L 41/16
USPC .......................................................... 709/224
See application file for complete search history.

(56) References Cited

U.S. PATENT DOCUMENTS

| 11,336,548 B1* | 5/2022 | Zhang ................... H04L 41/22 |
| 2016/0086125 A1* | 3/2016 | Hanrahan ........ G06Q 10/06398 |
| | | 705/7.42 |
| 2020/0145304 A1* | 5/2020 | Wulff ................... H04L 43/045 |
| 2021/0051503 A1* | 2/2021 | Bodiga ......... H04W 36/008375 |
| 2021/0294818 A1* | 9/2021 | Savalle ............... H04L 43/0817 |
| 2024/0333615 A1* | 10/2024 | Ford ..................... H04L 43/045 |

FOREIGN PATENT DOCUMENTS

WO WO-2024213233 A1 * 10/2024 ............ H04W 24/10

* cited by examiner

*Primary Examiner* — Karen C Tang
(74) *Attorney, Agent, or Firm* — HAUPTMAN HAM, LLP

(57) ABSTRACT

A Trend Deviation-Based Quantitative Key Performance Indictors (KPI) Normalizer and method for a Smart Service Analyzer. Trend Deviation-Based Quantitative Key Performance Indictors (KPI) Normalizer receives User Level Quantitative Key Performance Indictors (KPIs) at a Cluster Based Aggregator. Cluster-Based Aggregation of the User Level Quantitative KPIs is performed to generate Network Level Quantitative KPIs. A forecasted trend is determined based on the Network Level Quantitative KPIs. The User Level Quantitative KPIs are processed by comparing against a forecasted Network Level Quantitative KPI to generate Normalized Quantitative KPIs at the User Level based on the forecasted trend, wherein the Normalized Quantitative KPIs at the User Level include a deviation from the forecasted trend.

23 Claims, 10 Drawing Sheets

NORMALIZING A TREND DEVIATION-BASED QUANTITATIVE KEY PERFORMANCE INDICTOR (KPI)

TECHNICAL FIELD

This description relates to normalizing a Trend Deviation-Based Quantitative Key Performance Indictor (KPI).

BACKGROUND

Network performance prediction is used for enabling agile capacity planning in mobile networks. Capacity planning for mobile networks presents a challenge for network planners as traffic in mobile networks continues to grow exponentially. In addition to the growing load in mobile networks, network performance dynamically changes. Performance downgrade is expected to occur in response to a lack of investment in additional capacity. Simultaneously, user and application demand for throughput and latency is ever increasing.

A further problem is that the process of adding capacity to mobile networks comes with long cycles. Mobile operators typically need six months to add a 4G or a 5G layer, and two years to build new base stations. Finally, there is pressure to justify capital expenditures. In such circumstances, predictive planning plays a role. The decision-making process on capacity addition needs to be based on the accurate estimation of future network performance, and what-if evaluations of different scenarios of traffic growth, network performance and capacity expansions.

Predicting user experience in terms of data throughput in Fourth Generation (4G) and Fifth Generation (5G) mobile network, which are based on Orthogonal Frequency Division Multiple Access (OFDMA) techniques, involves consideration of various parameters. For example, spectrum assets of mobile operators are spread over channels in different frequency bands. Channel bandwidth in Long Term Evolution (LTE) systems is 5, 10, 15 or 20 MHZ, while in 5G it can be 50-100 MHz in lower frequency bands, and up to 400 MHz on higher frequency bands. LTE and 5G systems have resource grids deployed over channels, where the available spectrum is split into Resource Blocks (RBs). In LTE, Resource Blocks (RBs) have a size of 180 kHz, whereas in 5G the size is flexible with a value between 180 kHz and 1440 kHz, depending on use case/numerology.

User data throughput in such systems is driven by the number of available resource blocks for users and spectral efficiency of the system. The number of available resource blocks that are shared between users depends on various factors, including network density (number of base stations deployed in area of interest), user density (number of users to be served in area of interest) and deployed capacity (number of frequency channels and bandwidths used by base stations on 4G and 5G networks). Spectral efficiency of the system is measured as an achievable throughput per RB.

Network planners are thus called on to estimate the performance of different services, such as Voice Call, Video Applications, Gaming Applications, Streaming, Roaming, etc., at the user and the network level. Performance patterns change depending on various factors, such as spectrum assets, network grid-topology and density, quality of radio design and implemented radio solutions, network maturity, user distribution and traffic mix, etc. Mobile communication systems provide a very advanced performance measurement capability. Measurements cover different events in the network and various metrics are available. For example, probing devices in the network infrastructure collect Call Detail Record (CDR) data by monitoring, recording, and analyzing network activity at the subscriber level. CDR provides the detailed record of all activities that pass through the telecommunications equipment. CDR allows telecom operators to collect a wide variety of data from the RAN and CORE interfaces of the network. The performances are estimated as Numerical Index or Ratio (0~100%). The User Level Index is referred to as Customer Experience Index (CEI) and the Network Level Index is referred to as Service Quality Index (SQI). A Key Performance Indicator (KPI) is applied to CDR data. However, difficulty lies in the ability to process the large volume of CDR data, as well as the transformation of such a large volume of data into actionable intelligence.

SUMMARY

In at least embodiment, a method includes receiving User Level Quantitative Key Performance Indictors (KPIs) at a Cluster Based Aggregator. Cluster-based aggregation of the User Level Quantitative KPIs is performed to generate Network Level Quantitative KPIs. A forecasted trend is determined based on the Network Level Quantitative KPIs. The User Level Quantitative KPIs are processed by comparing against a forecasted Network Level Quantitative KPI to generate Normalized Quantitative KPIs at the User Level based on the forecasted trend, wherein the Normalized Quantitative KPIs at the User Level include a deviation from the forecasted trend.

In at least one embodiment, a Trend Deviation-Based Quantitative Key Performance Indicator (KPI) Normalizer includes a memory storing computer-readable instructions, and a processor connected to the memory, wherein the processor is configured to execute the computer-readable instructions to perform operations to receive User Level Quantitative Key Performance Indictors (KPIs). Cluster-based aggregation of the User Level Quantitative KPIs is performed to generate Network Level Quantitative KPIs. A forecasted trend is determined based on the Network Level Quantitative KPIs. The User Level Quantitative KPIs are processed by comparing against a forecasted Network Level Quantitative KPI to generate Normalized Quantitative KPIs at the User Level based on the forecasted trend, wherein the Normalized Quantitative KPIs at the User Level include a deviation from the forecasted trend.

In at least one embodiment, a non-transitory computer-readable media having computer-readable instructions stored thereon, which when executed by a processor causes the processor to perform operations including receiving User Level Quantitative Key Performance Indictors (KPIs) at a Cluster Based Aggregator. Cluster-based aggregation of the User Level Quantitative KPIs is performed to generate Network Level Quantitative KPIs. A forecasted trend is determined based on the Network Level Quantitative KPIs. The User Level Quantitative KPIs are processed by comparing against a forecasted Network Level Quantitative KPI to generate Normalized Quantitative KPIs at the User Level based on the forecasted trend, wherein the Normalized Quantitative KPIs at the User Level include a deviation from the forecasted trend.

BRIEF DESCRIPTION OF THE DRAWINGS

Features, aspects, and advantages of certain exemplary embodiments of the disclosure will be described below with reference to the accompanying drawings, in which like reference numerals denote like elements, and wherein.

DETAILED DESCRIPTION

Figure 1:
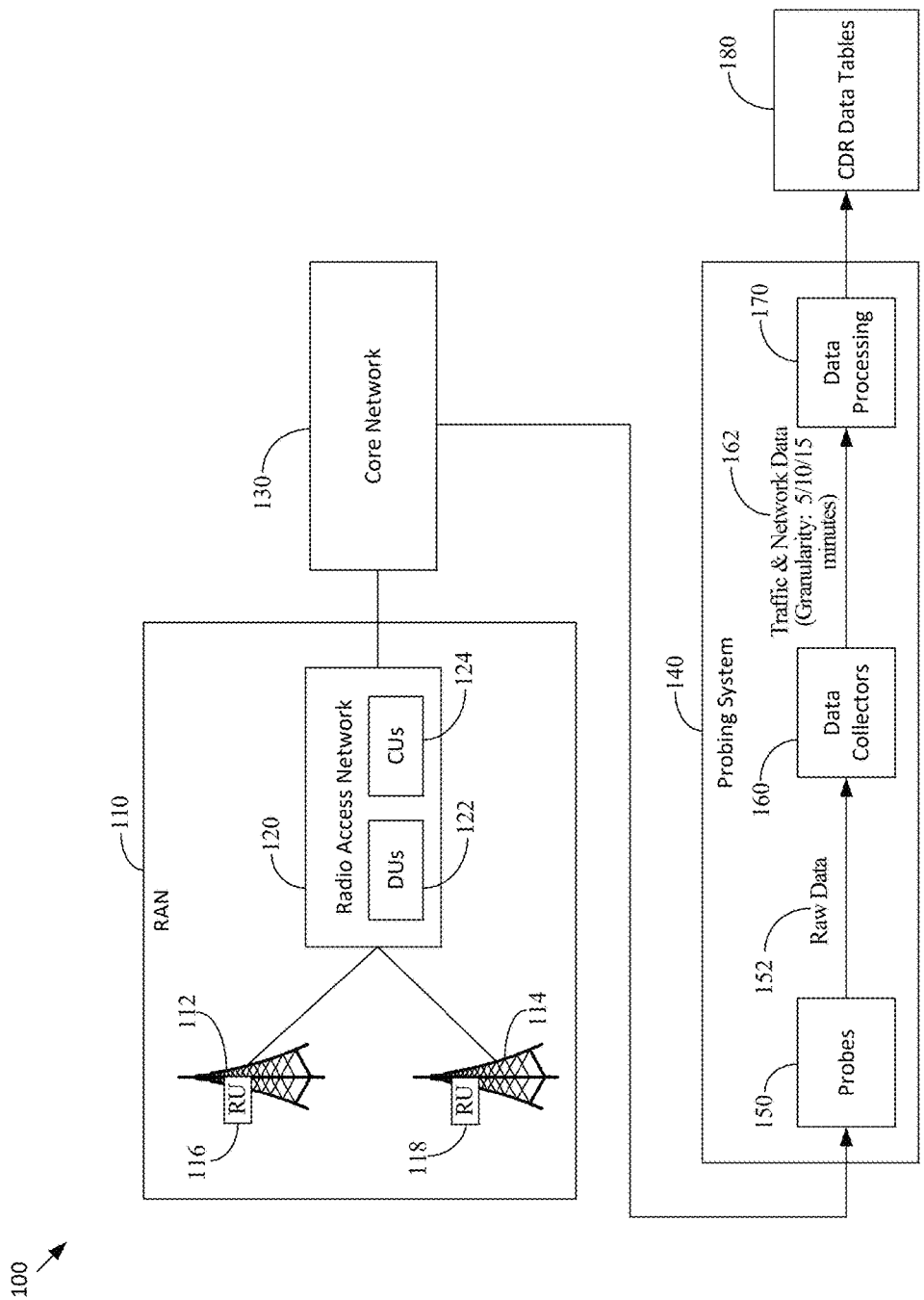
FIG. 1 illustrates a block diagram of a Mobile Network according to at least one embodiment.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched, as long as these modifications may not affect the resulting scope of the invention.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streaming or signaling-streaming from UE.

The foregoing disclosure provides illustration and description but is not intended to be exhaustive or to limit the implementations to the precise form disclosed. Modifications and variations are possible in light of the above disclosure or may be acquired from practice of the implementations.

The Smart Service Analyzer is a Machine Learning based architecture that performs sophisticated activity in terms of processing. The Smart Service Analyzer is used to reliably estimate the performance of different services like voice calls, video applications, gaming applications, streaming data, roaming, etc. at the user and the network level. The Smart Service Analyzer determines the performance of those services. The performances are estimated as numerical index or ratio (0-100%). The user level index is referred to as Customer Experience Index (CEI) and the Network Level Index is referred to as Service Quality Index (SQI) for a particular network or a portion of the network. Machine Learning is applied at CEI Estimator and the SQI Estimator using historical user level KPIs. KPIs includes parameters of key performance indicator collected from the Call Detail Record (CDR) data, which comes from the probing devices of the network architecture/network infrastructure. The CEI and SQI estimation is generalized so that the CEI and SQI do not utilize any change or modification after KPIs are added to a service or removed from a service. Data Analytics and Machine Learning (ML) algorithms are applied to automatically estimate the priority of the KPIs in a service. KPI Performance Thresholds are dynamically updated by analyzing trend shifts. A KPI Normalizer normalizes User Level Qualitative KPIs and User Level Quantitative KPIs. User Level Qualitative Key Performance Indicator (KPI)

values and User Level Quantitative KPI values are received by a KPI Normalizer. User Level Quantitative KPIs are provided to a Trend Deviation Based KPI Normalizer. The User Level Quantitative KPIs are normalized using the Trend Deviation Based KPI Normalizer to produce Normalized Quantitative KPIs based on a Trend Update.

In at least one embodiment, a method includes receiving User Level Quantitative Key Performance Indictors (KPIs) at a Cluster Based Aggregator, performing cluster-based aggregation of the User Level Quantitative KPIs to generate Network Level Quantitative KPIs, determining a forecasted trend based on the Network Level Quantitative KPIs, and processing the User Level Quantitative KPIs by comparing against a forecasted Network Level Quantitative KPI to generate Normalized Quantitative KPIs at the User Level based on the forecasted trend, wherein the Normalized Quantitative KPIs at the User Level include a deviation from the forecasted trend.

Embodiments described herein provide method that provides one or more advantages. For example, the Smart Service Analyzer provided an end-to-end automated solution. The Smart Service Analyzer is able to be used as a tool by network engineers to estimate the impact of different services at the user level and at the network level without updating logic and while adding or deleting KPIs from a service. The Smart Service Analyzer notifies stakeholders via automatic email systems while any significant deviation or change is detected in quantitative KPI trends. A KPI Normalizer normalizes User Level Qualitative KPIs and User Level Quantitative KPIs. A Trend Deviation-Based Quantitative Key Performance Indictors (KPI) Normalizer normalizes User Level Quantitative KPIs based on deviation from the Network Level Benchmark Trend.

FIG. 1 illustrates a block diagram of a Mobile Network 100 according to at least one embodiment.

In FIG. 1, Mobile Network 100 includes Radio Access Network (RAN) 110. RAN 110 includes eNodeBs 112, 114 for a cell site, which connect to a functional units that form the Radio Network Controller 120. RAN 110 is connected to Core Network 130, which provides access to voice and data networks, such as Internet and Public Switched Telephone Network (PSTN). Disaggregation of RAN 110 involves breaking down of functions into Radio Units (RUs) 116, which are located at the cell tower, Distributed Units (DUs) 122, and Centralized Units (CUs) 124 that form the remainder of the RAN 110. The distribution of the of the RAN across these components is defined by the functional split option that is used. There are various split options for how the RAN functions are split between the RUs 116, 118, DUs 122, and CUs 124.

Mobile Network also includes Probing System 140 for obtaining data about Mobile Network 100. Probing System 140 includes Probes 150. Probes 150 obtain Raw Data 152 that is provide to Data Collectors 160. Data Collectors 160 provide Traffic Network Data 162 to Data Processing 170. Data Processing 170 generates CDR Data Tables 180 based on the Traffic and Network Data 162.

Probes 150 obtains Raw Data 152 from Mobile Network 100 to use as input to a KPI Generator. Probes 150 are devices or software that act as a messenger and converts network communications into an analyzable format. Probes 150 are used to obtain Raw Data 152 about traffic in the Mobile Network 100 that is able to be used to obtain reliable insight into the subscriber experience, and used to analyze the performance and behavior of components of Mobile Network 100 via KPIs. Raw Data 152 is processed into a format, e.g., CDR Data Tables 180, that is able to be used to troubleshoot issues on Mobile Network 100 and to identify root cause of the issue by generating CDR Data Tables 180 per session per subscriber.

CDR Probing Data Tables 180 are able to be provided to a KPI Generator as described below. The CDR Data Tables 180 are provided at a predetermined granularity, e.g., 5 minutes, 10 minutes, 15 minutes, etc. CDR Data Tables 180 include information broken down into different categories. The categories include GI interface, GN interface, Reference Signal Received Power (RSRP), Session Initiation Protocol (SIP), Radio Resource Control (RRC) LTE, S2 Application Protocol (S2AP), Diameter interface, etc. The Probes 150 obtain different types of Raw Data 152 from different types of modules of Mobile Network 100, e.g., DUs 122, CUs 124, etc., which is accumulated by Data Collectors 160. Traffic and Network Data is processed at Data Processing 170 to produce CDR Data Tables 180. Previously, historical probing data was used instead of the User Level KPIs.

Figure 2:
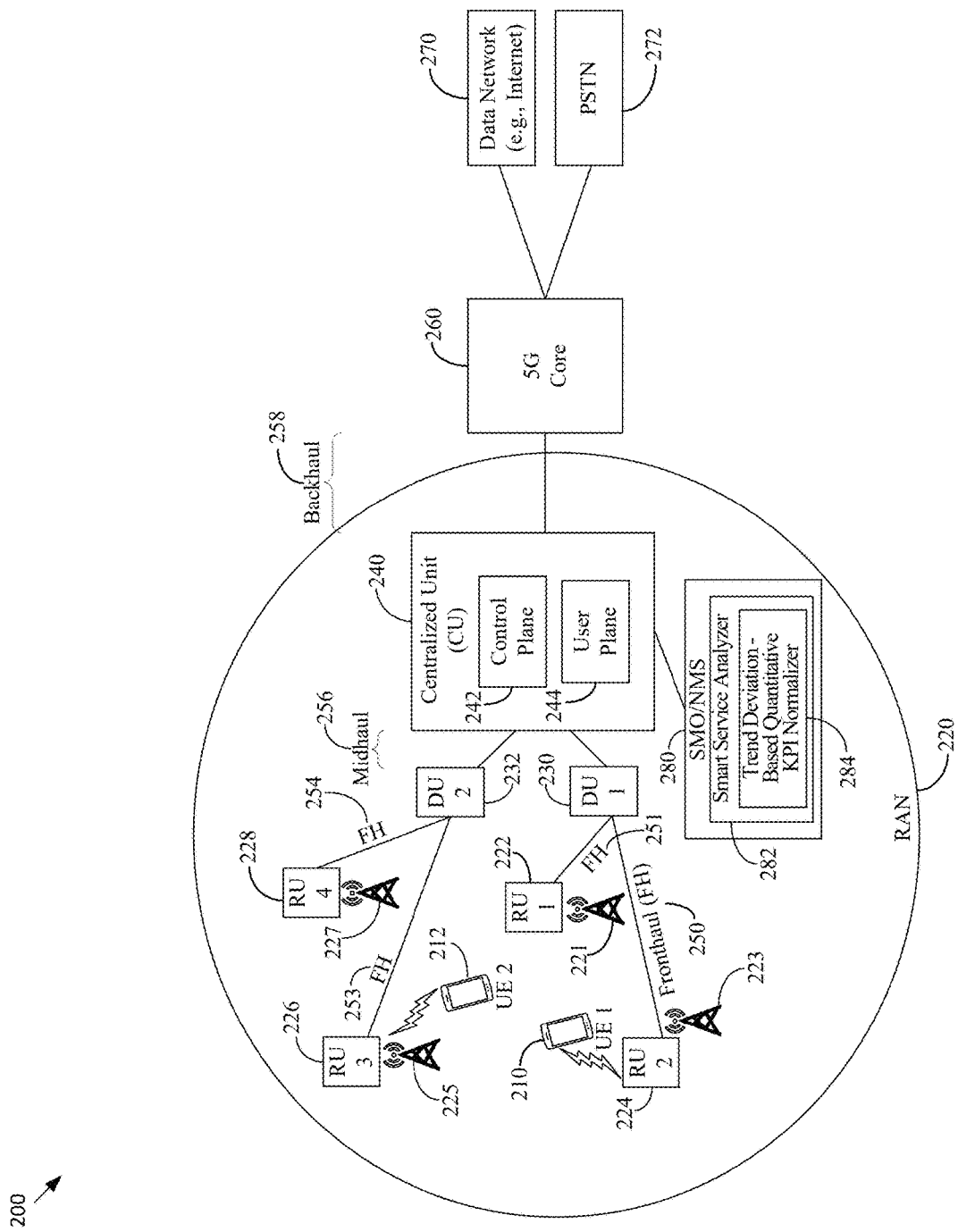
FIG. 2 illustrates a mobile network according to at least one embodiment.

FIG. 2 illustrates a mobile network 200 according to at least one embodiment.

In FIG. 2, UE 2 (User Equipment 2) 210 and UE 2 212 access Mobile Network 200 via a Radio Access Network (RAN) 220. Software functions of RAN 220 are able to be separated from specialized hardware, which is referred to as disaggregation. Disaggregation lead to the virtualization of RAN software, thus enabling RAN functions to be hosted on general-purpose, commercial-off-the-shelf (COTS) hardware. Thus, functions of RAN 220 are able to be split using different split options to implement a Centralized-RAN or Cloud-RAN (C-RAN), Virtualized RAN (V-RAN), an Open-RAN (O-RAN).

RAN 220 includes Radio Towers 221, 223, 225, and 227. Radio Towers 221, 223, 225, 227 are associated with RU (Radio Unit) 2 222, RU 2 224, RU 3 226, and RU 4 228, respectively.

RU 2 222, RU 2 224, RU 3 226, RU 4 228 handle the Digital Front End (DFE) and the parts of the PHY layer, as well as the digital beamforming functionality. RU 2 222 and RU 2 224 are associated with Distributed Unit (DU) 2 230, and RU 3 226 and RU 4 228 are associated with DU 2 232. DU 2 230 and DU 2 232 are responsible for real time Layer 2 and Layer 2 scheduling functions. For example, in 5G, Layer-1 is the Physical Layer, Layer-2 includes the Media Access Control (MAC), Radio link control (RLC), and Packet Data Convergence Protocol (PDCP) layers, and Layer-3 (Network Layer) is the Radio Resource Control (RRC) layer. Layer 2 is the data link or protocol layer that defines how data packets are encoded and decoded, how data is to be transferred between adjacent network nodes. Layer 3 is the network routing layer and defines how data is moves across the physical network.

DU 2 230 is coupled to the RU 2 222 and RU 2 224, and DU 2 232 is coupled to RU 3 226 and RU 4 228. DU 2 230 and DU 2 232 run the RLC, MAC, and parts of the PHY layer. DU 2 230 and DU 2 232 include a subset of the eNB/gNB functions, depending on the functional split option, and operation of DU 2 230 and DU 2 232 are controlled by Centralized Unit (CU) 240. CU 240 is responsible for non-real time, higher L2 and L3. Server and relevant software for CU 240 is able to be hosted at a site or is able to be hosted in an edge cloud (datacenter or central office) depending on transport availability and the interface for the Fronthaul connections 250, 251, 253, 254. The server and relevant software of CU 240 is also able to be co-located at DU 2 230 or DU 2 232, or is able to be hosted in a regional cloud data center.

CU 240 handles the RRC and PDCP layers. The gNB includes CU 240 and one or more DUs, e.g., DU 2 230, connected to CU 240 via Fs-C and Fs-U interfaces for a Control Plane (CP) 242 and User Plane (UP) 244, respectively. CU 240 with multiple DUs, e.g., DU 2 230, and DU 2 232, support multiple gNBs. The split architecture enables a 5G network to utilize different distribution of protocol stacks between CU 240, and DU 2 230 and DU 2 232, depending on network design and availability of the Midhaul 256. While two connections are shown between CU 240 and DU 2 230 and DU 2 232, CU 240 is able to implement additional connections to other DUs. CU 250, in 5G, is able to implement, for example, 256 endpoints or DUs. CU 240 supports the gNB functions such as transfer of user data, mobility control, RAN sharing (MORAN), positioning, session management, etc. However, one or more functions are able to be allocated to the DU. CU 240 controls the operation of DU 230 and DU 232 over the Midhaul interface 256.

Backhaul 258 connects the 4G/5G Core 260 to the CU 240. Core 260 may be, for example, up to 200 km away from the CU 240. Core 260 provides access to voice and data networks, such as Internet 270 and Public Switched Telephone Network (PSTN) 272.

RAN 220 is able to implement beamforming that allows for directional transmission or reception. 5G beamforming enables 5G connections to be more focused toward a receiving device. RAN 220 is also able to implement MIMO (Multiple Input Multiple Output), including mMIMO (massive MIMO), to provide an increases in throughput and signal-to-noise ratio (SNR). MIMO improves the radio link by using the multiple paths over which signals travel from the transmitter to the receiver. The multiple paths are de-correlated and this provides the opportunity to send multiple data streams over them.

Massive MIMO and dense small cell deployments are being implemented to improve radio resource efficiency. However, the intra-cell interference from neighboring cells presents a serious problem. According to at least one embodiment, the modeling of interference patterns in a Massive MIMO deployment is used to identify interfering beams between different sectors so that interference optimization techniques are able to be applied to address interference.

According to at least one embodiment, a northbound platform for the network is provided, such as a Service Management and Orchestration (SMO)/NMS 280. SMO 280 oversees the orchestration aspects, and the management and automation of RAN elements. SMO 280 supports O1, A1 and O2 interfaces. SMO 280 includes Smart Service Analyzer 282, which is a Machine Learning based architecture that performs sophisticated activity in terms of processing. Smart Service Analyzer 282 is used to reliably estimate the performance of different services like voice calls, video applications, gaming applications, streaming data, roaming, etc. at the user and the network level. Smart Service Analyzer 282 determines the performance of those services. The performances are estimated as numerical index or ratio (0-100%). The user level index is referred to as Customer Experience Index (CEI) and the Network Level Index is referred to as Service Quality Index (SQI) for a particular network or a portion of the network. Trend Deviation-Based Quantitative KPI Normalizer 284 is used to normalize User Level Quantitative KPI values in a performance Range between 0 and 100% based on based on deviation from the Network Level Benchmark Trend. User Level Quantitative Key Performance Indictors (KPIs) at a Cluster Based Aggregator Smart Service Analyzer 282 receives User Level Quantitative Key Performance Indictors (KPIs) at a Cluster Based Aggregator at Trend Deviation-Based Quantitative Key Performance Indictors (KPI) Normalizer 284. Trend Deviation-Based Quantitative KPI Normalizer 284 performs Cluster-Based Aggregation of the User Level Quantitative KPIs to generate Network Level Quantitative KPIs. Trend Deviation-Based Quantitative KPI Normalizer 284 determines a forecasted trend based on the Network Level Quantitative KPIs. Trend Deviation-Based Quantitative KPI Normalizer 284 processes the User Level Quantitative KPIs by comparing against a forecasted Network Level Quantitative KPI to generate Normalized Quantitative KPIs at the User Level based on the forecasted trend. The Normalized Quantitative KPIs at the User Level include a deviation from the forecasted trend.

Figure 3:
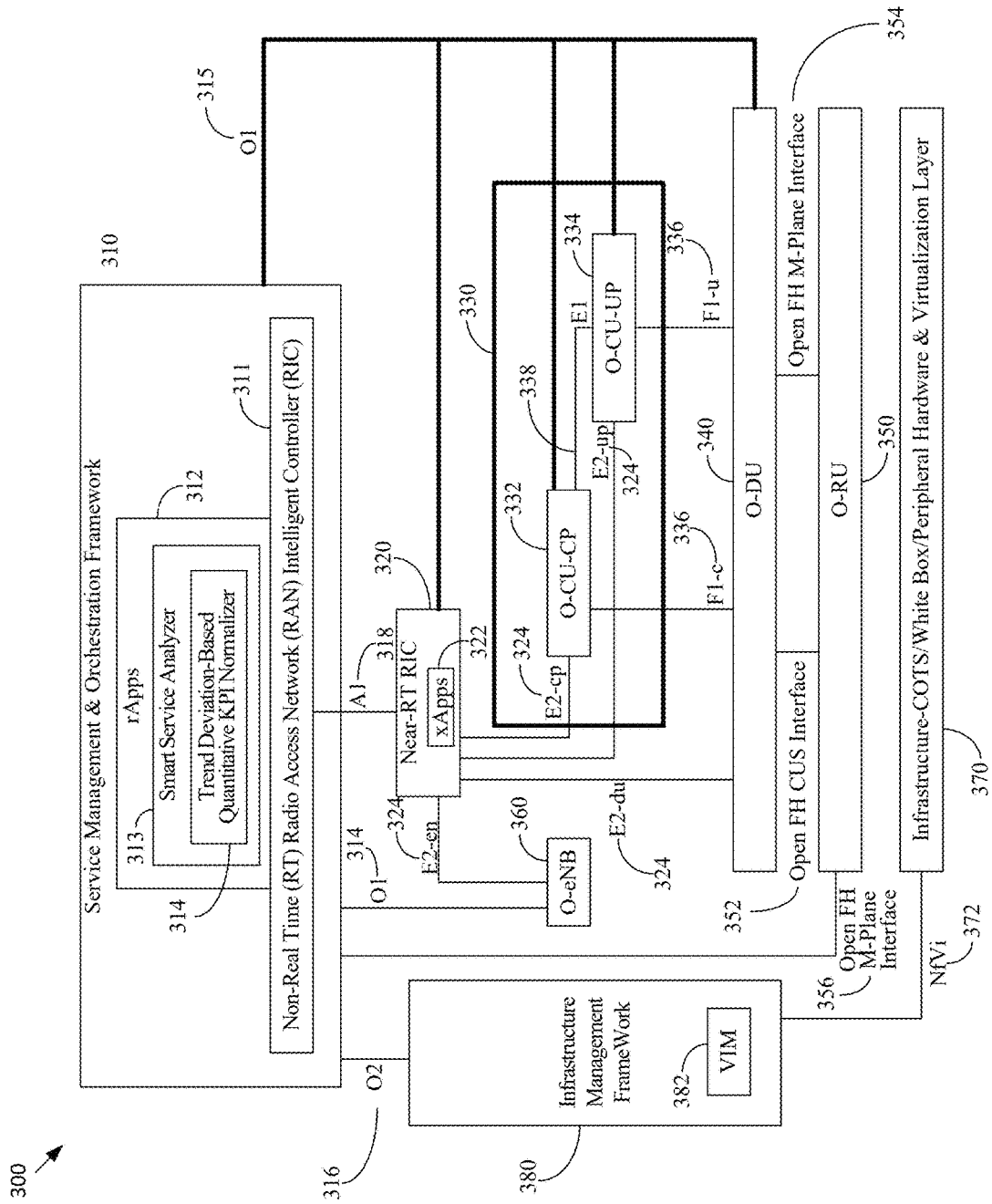
FIG. 3 is a block diagram of an Open Radio Access Network (O-RAN) according to at least one embodiment.

FIG. 3 is a block diagram of an Open Radio Access Network (O-RAN) 300 according to at least one embodiment.

In FIG. 3, Service Management and Orchestration (SMO) Framework 310 is an automation platform for Open RAN Radio Resources. SMO 310 oversees lifecycle management of network functions as well as O-Cloud. SMO 310 includes a Non-Real-Time (RT) Radio Access Network (RAN) Intelligent Controller (RIC) 311. SMO 310 also defines various SMO interfaces, such as the O1 315, O2 316, and A1 318 interfaces.

The A1 interface 318 enables communication between the Non-RT RIC 311 and a Near-RT RIC 320 and supports policy management, data transfer, and machine learning management. The A1 interface 318 is also used for policy guidance. SMO 310 provides fine-grained policy guidance such as getting User-Equipment to change frequency, and other data enrichments to RAN functions over the A1 interface 318.

The O1 315 interface connects the SMO 310 to the RAN managed elements, which include the Near-RT RIC 320, O-RAN Centralized Unit (O-CU) 330, O-RAN Distributed Unit (O-DU) 340, and the Open Evolved NodeB (O-eNB) 360. The management and orchestration functions are received by the managed elements via the O1 interface 315. The SMO 310 in turn receives data from the managed elements via the O1 interface 315 for A1 model training at the Non-RT RIC 311. The O1 interface 315 is further used for managing the operation and maintenance (OAM) of multi-vendor Open RAN functions including fault, configuration, accounting, performance and security management, software management, and file management capabilities.

The O2 interface 316 is used to support cloud infrastructure management and deployment operations with O-Cloud infrastructure that hosts the Open RAN functions in the network. The O2 interface 316 supports orchestration of O-Cloud infrastructure resource management (e.g., inventory, monitoring, provisioning, software management and lifecycle management) and deployment of the Open RAN network functions, providing logical services for managing the lifecycle of deployments that use cloud resources.

SMO 310 provides a common data collection platform for management of RAN data as well as mediation for the O1 315, O2 316, and A1 318 interfaces. Licensing, access control and AI/ML lifecycle management are supported by the SMO 310, together with legacy north-bound interfaces.

SMO 310 also supports existing OSS functions, such as service orchestration, inventory, topology and policy control.

The Non-RT RIC 311 enables non-real-time (>1 second) control of RAN elements and their resources through cloud-native microservice-based applications, which are referred to as rApps 312. An rApp 312 is able to implement a Smart Service Analyzer 313 that includes a Trend Deviation-Based Quantitative Key Performance Indicator (KPI) Normalizer 314. Non-RT RIC 311 communicates with applications called xApps 322 running on a Near-RT RIC 311 to provide policy-based guidance for edge control of RAN elements and their resources. The Non-RT RIC 311 provides non-real-time control and optimization of RAN elements and resources, AI/ML workflow, including model training of the Trend Deviation-Based Quantitative KPI Normalizer 314 of Smart Service Analyzer 313, updates, and policy-based guidance of applications/features in Near-RT RIC 320.

Near-RT RIC 320 controls RAN infrastructure at the cloud edge. Near-RT RIC 320 controls RAN elements and their resources with optimization actions that typically take 10 milliseconds to one second to complete. The Near-RT RIC 320 receives policy guidance from the Non-RT RIC 311 and provides policy feedback to the Non-RT RIC 311 through the xApps 322.

The xApps 322 are used to enhance the RAN's spectrum efficiency. The Near-RT RIC 320 manages a distributed collection of "southbound" RAN functions, and also provides "northbound" interfaces for operators: the O1 315 and A1 318 interfaces to the Non-RT RIC 311 for the management and optimization of the RAN. The Near-RT RIC 320 is thus able to self-optimize across different RAN types, like macros, Massive MIMO and small cells, maximizing network resource utilization for 5G network scaling.

Within the Near-RT RIC 320, the xApps 322 communicate via defined interface channels. An internal messaging infrastructure provides the framework to handle conflict mitigation, subscription management, app lifecycle management functions, and security. Data transfers are implemented via the E2 interfaces 324.

The O-RAN is split into a Central Unit (CU) 330, a Distributed Unit (DU) 340, and a Radio Unit (RU) 350. The CU 330 is further split into two logical components, one for the Control Plane (CP) 332, and one for the User Plane (UP) 334. The logical split of the CU 330 into the CP 332 and UP 334 allows different functionalities to be deployed at different locations of the network, as well as on different hardware platforms. For example, CUs 330 and DUs 340 can be virtualized on white box servers at the edge, while the RUs 350 are implemented on Field Programmable Gate Arrays (FPGAs) and Application-specific Integrated Circuits (ASICs) boards and deployed close to RF antennas.

The O-RAN Distributed Unit (O-DU) 340 is an edge server that includes baseband processing and radio frequency (RF) functions. The O-DU 340 hosts radio link control (RLC), MAC, and a physical layer with network function virtualization or containers. O-DU 340 supports one or more cells, and the O-DUs 340 are able to support one or more beams to provide the operating support for O-RU 350 by CUS (Control, User, and Synchronization) planes 352, and management (M) planes 354 through front-haul interfaces.

The O-RU 350 processes radio frequencies received by the physical layer of the network. The processed radio frequencies are sent to the O-DU 340 through fronthaul interfaces 352, 354. The O-RU 350 hosts the lower PHY Layer Baseband Processing and RF Front End (RF FE), and is designed to support multiple 3GPP split options.

An Open-Evolved Node B (O-eNB) 360 provides the hardware aspect of the O-RAN. The management and orchestration functions are received by the managed elements via the O1 interface 315. The SMO 310 in turn receives data from the managed elements via the O1 interface 315 for the Trend Deviation-Based Quantitative KPI Normalizer 314 of Smart Service Analyzer 313 implemented by rApps 312 at Non-RT RIC 311. The O-eNB 360 communicates with the Near-RT RIC 320 via the E2 interface 324. E2 324 enables near-real-time loops through the streaming of telemetry from the RAN and the feedback with control from the Near-RT RIC 320. The E2 interface 324 connects the Near-RT RIC 320 with an E2 node, such as the O-CU-CP 332, O-CU-UP 334, the O-DU 340, and the O-eNB 360. An E2 node is connected to one Near-RT RIC 320, while a Near-RT RIC 320 is able to be connected to multiple E2 nodes. The protocols over the E2 interface 324 are based on the control plane and supports services and functions of Near-RT RIC 320.

An F1 Interface 336 connects the O-CU-CP 332 and the O-CU-UP 334 to the O-DU 340. Thus, the F1 interface 336 is broken into control and user plane subtypes and exchanges data about the frequency resource sharing and other network statuses. One O-CU 330 can communicate with multiple O-DUs 340 via F1 interfaces 336.

An E1 338 interface connects the O-CU-CP 332 and the O-CU-UP 334. The E1 Interface 338 is used to transfer configuration data and capacity information between the O-CU-CP 332 and the O-CU-UP 334. The configuration data ensures the O-CU-CP 332 and the O-CU-UP 334 are able to interoperate. The capacity information is sent from the O-CU-UP 334 to the O-CU-CP 332 and includes the status of the O-CU-UP 334.

The O-DU 340 communicates with the O-RU 350 via an Open Fronthaul (FH) Control, User, and Synchronization (CUS) Plane Interface 352 and an Open Fronthaul (FH) M-Plane (Management Plane) Interface 354. As part of the CUS Plane Interface 352, the C-Plane (control plane) is a frame format that carries data in real-time control messages between the O-DU 340 and O-RU 350 for use to control user data scheduling, beamforming weight selection, numerology selection, etc. Control messages are sent separately for downlink (DL)-related commands and uplink (UL)-related commands.

The U-Plane of the CUS Plane Interface 352 carries the user data messages between the O-DU 340 and O-RU 350, such as the in-phase and quadrature-phase (IQ) sample sequence of the orthogonal frequency division multiplexing (OFDM) signal. The S-plane of the CUS Plane Interface 352 includes synchronization messages used for timing synchronization between O-DU 340 and O-RU 350. The Control and User Plane of the CUS Plane Interface 352 are also used to send information specifying beamforming weights from the O-DU 340 to O-RU 350. Other information includes time resource and frequency resource information.

The Open FH M-Plane 354 connects the O-RU 350 to the O-DU 340, and an optional Open FH M-Plane 356 connects the O-RU 350 to the SMO 310. The O-DU 340 uses the Open FH M-Plane 354 to manage the O-RU 350, while the SMO 310 is able to provide FCAPS (Fault, Configuration, Accounting, Performance, Security) services to the O-RU 350. The Open FH M-plane 354 supports the management features including startup installation, software management, configuration management, performance management, fault management and file management.

The Open FH M-Plane 354 is used by the O-DU 340 to retrieve the capabilities of the O-RU 350 and to send relevant configuration related to the C-Plane and U-Plane (data plane) of the Open FH CUS Interface 352 to the O-RU 350. Together the O1 315 and Open FH M-plane 354 interfaces provide a FCAPS interface with configuration, reconfiguration, registration, security, performance, monitoring aspects exchange with individual nodes, such as O-CU-CP 332, O-CU-UP 334, O-DU 340, and O-RU 350, as well as Non-RT RIC 320.

According to at least one embodiment, AI-Based Network Management is provided at the 5G Edge, such as by a Smart Service Analyzer 313 of rApp 312 at a Non-RT RIC 311.

The Smart Service Analyzer 313 is a Machine Learning based architecture that performs sophisticated activity in terms of processing. The Smart Service Analyzer 313 is used to reliably estimate the performance of different services like voice calls, video applications, gaming applications, streaming data, roaming, etc. at the user and the network level. The Smart Service Analyzer 313 determines the performance of those services. The performances are estimated as numerical index or ratio (0-100%). The user level index is referred to as Customer Experience Index (CEI) and the Network Level Index is referred to as Service Quality Index (SQI) for a particular network or a portion of the network. Machine Learning is applied to generate CEI Estimates and SQI Estimates using historical user level KPIs. A Key Performance Indicator (KPI) includes parameters collected from the Call Detail Record (CDR) data, which comes from the probing devices of the network architecture/network infrastructure. CDR provides a detailed record of all activities that pass through the telecommunications equipment. CDR allows telecom operators to collect a wide variety of data from the RAN and CORE interfaces of the network. CDR probing data refers to the process of collecting the CDR data through the probing devices. The role of probing devices is to collect the real-time records of a network equipment and send it to a data center.

The CEI Estimates and SQI Estimates are generalized so that the Smart Service Analyzer 313 does not utilize any change or modification after KPIs are added to a service or removed from a service. Data Analytics and Machine Learning (ML) algorithms are applied by the Smart Service Analyzer 313 to automatically estimate the priority of the KPIs in a service. Trend Deviation-Based Quantitative Key Performance Indicator (KPI) Normalizer 314 is used to normalize User Level Quantitative KPI values in a performance Range between 0 and 100% based on deviation from the Network Level Benchmark Trend.

Infrastructure-COTS/White Box/Peripheral Hardware & Virtualization Layer 370 connects to Infrastructure Management Framework 380 via Network Function Virtualization Interface (NFVI) 372. Virtualized Infrastructure Manager (VIM) 382 at Infrastructure Management Framework 380 controls and manages virtual network functions.

Figure 4:
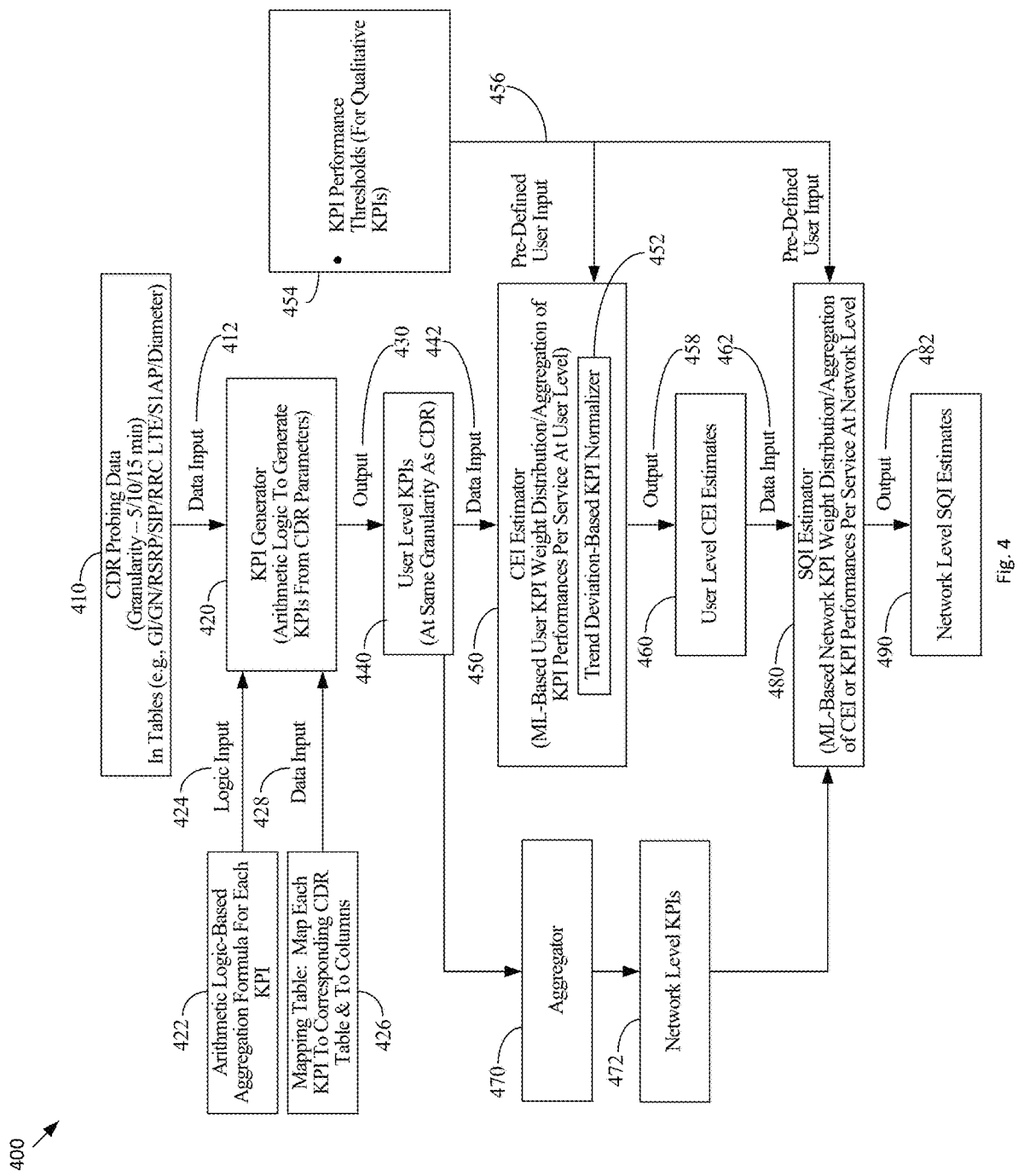
FIG. 4 is a functional block diagram of a Smart Service Analyzer according to at least one embodiment.

FIG. 4 is a functional block diagram of a Smart Service Analyzer 400 according to at least one embodiment.

In FIG. 4, Smart Service Analyzer 400 implements a KPI Normalizer 452 at CEI Estimator 450. Trend Deviation-Based Quantitative Key Performance Indictors (KPI) Normalizer 452 normalizes User Level Quantitative KPI values in a performance Range between 0 and 100% based on deviation from the Network Level Benchmark Trend. CDR Probing Data 410 from the probing devices in the network architecture is provided as Input 412 to a KPI Generator 420. A probe is a device or software that acts as a messenger and converts network communications into an analyzable format. Probes are used to analyze network traffic and obtain reliable insight into the subscriber experience, analyze the performance and behavior of network components in a dynamic environment via KPIs, and troubleshoot issues on the network and identify root cause of the issue by generating CDR Probing Data 410 per session per subscriber.

CDR Probing Data 410 is provided to the KPI Generator 420 in tables. The CDR Probing Data 410 is provided at a predetermined granularity, e.g., 5 minutes, 10 minutes, 15 minutes, etc. CDR Probing Data also has different categories. The categories include GI interface, GN interface, Reference Signal Received Power (RSRP), Session Initiation Protocol (SIP), Radio Resource Control (RRC) LTE, S2 Application Protocol (S2AP), Diameter interface, etc. The different types of probing data obtained from different types of network modules and are accumulated. Previously, it was users historical probing data was used instead of the User Level KPIs.

As mentioned above, the Customer Experience Index is referred to as Customer Experience Index (CEI) Estimates and the Network Level Index is referred to as Service Quality Index (SQI) Estimates, which are produced using KPIs. KPIs are first calculated from the CDR Probing Data 410. KPI Generator 420 receives an arithmetic logic-based Aggregation Formula 422 for KPIs that are provide as Logic Input 424 to KPI Generator 420. The Aggregation Formulas 422 are also provided by network engineers. Mapping information is provided by Mapping Table 426 that is provided as Data Input 428 to KPI Generator 420. Mapping Table 426 is provided by network engineers. The Mapping Table 424 maps a KPI to a corresponding CDR table and columns in the CDR table of CDR Probing Data 410. KPI Generator 420 runs arithmetic operations that use multiple columns of a table in CDR Probing Data 410 and maps which columns to apply arithmetic operation for which KPI, e.g., which columns in tables of CDR Probing Data 410 to use for which KPI. KPI Generator 420 applies arithmetic logic-based Aggregation Formula 422 for a KPI to generate the KPIs from the CDR Probing Data 410.

After running the arithmetic operations, the KPI Generator 420 produces as Output 430 the User Level KPIs 440. The User Level KPIs 440 is at the same granularity as the CDR Probing Data 410. User Level KPIs 440 are provided as Data Input 442 to CEI Estimator 450. CEI Estimator 450 applies Machine Learning to produce User Level CEI Estimates 460 at the service level based on the User Level KPIs 440. KPIs are divided into two categories: Qualitative KPIs and Quantitative KPIs. CEI Estimator 450 includes KPI Normalizer 452, which normalizes KPI values in a performance Range between 0 and 100%. Qualitative KPIs are scaled directly between 0 and 100% using pre-defined performance thresholds, such as Success-rate or Failure rate. Quantitative KPIs do not have any Performance Threshold, such as Release Cause Count or Data Traffic Throughput. In general, Quantitative KPIs do not have any qualitative range of values. Instead, Quantitative KPIs rely on what is the current quantity of those KPI values. For example, throughput to a device, success count or failure count of connectivity between two devices, etc. Counts or bandwidth information from throughput information are quantities.

KPI Performance Thresholds 454 for Qualitative KPIs are provided to the CEI Estimator 450 as Pre-Defined User Input 456 to CEI Estimator 450. Quantitative KPI Performance Thresholds 454 are able to be dynamically updated by analyzing trend shifts. KPI Performance Thresholds 454 refer to what extent of values represent a good KPI value or a bad KPI value. Sometimes KPI Performance Thresholds 454 are predefined by network engineers, while at other times KPI Performance Thresholds 454 are to be dynamic and are thus based on the trends. Thus, in response to a trend deviating from a band, new KPI Performance Thresholds 454 are created based on the shift of the trend. The dynamically updating of the KPI Performance Thresholds 454 based on trends is also automated. In response to a trend shift, stakeholders are able to be sent automatic emails indicating that the trend has shifted and the thresholds are to be updated. Thus, the stakeholders are able to review this information and confirm the trend shift.

Based on the KPI Performance Thresholds 454, CEI Estimator 450 applies Machine Learning to produce as Output 458 User Level CEI Estimates 460.

CEI Estimator 450 automatically estimates the priority of the User Level KPIs 440 in a service. Inside one service there could be several User Level KPIs 440 and which of the several User Level KPIs 440 are the highest priority is automatically estimated using Machine Learning.

CEI Estimator 450 applies Machine Learning to estimate KPI Weight Distribution for the services. The CEI Estimator 450 aggregates KPI performance per service at the user level. Thus, CEI Estimator 450 generalizes User Level CEI Estimates 460. Generalizing User Level CEI Estimates 460 results in no change or modification in response to a KPI being added or removed from a particular service. Previously, different types of predefined rule-based algorithms were changed in response to a KPI being removed from some service or added to a service. KPI trend shift events are able to be detected and alarms are automatically emailed to stakeholders or other experts, such as domain experts, network engineers, managers, etc.

User Level CEI Estimates 460 from CEI Estimator 450 are provided as Input 462 to SQI Estimator 480. User Level KPIs 440 are provided to an Aggregator 470 for aggregation to produce Network Level KPIs 472. Once the User Level KPIs are aggregated by Aggregator 470 at the network level to produce Network Level KPIs 472, the Network Level KPIs 472 are also provided to SQI Estimator 480.

Similar to the CEI Estimator 450, SQI Estimator 480 applies Machine Learning to the Network Level KPIs 472 and the User Level CEI Estimates 460 to produce Network Level SQI Estimates 490 at Output 482 of SQI Estimator 480.

SQI Estimator 480 produces Network Level SQI Estimates 490 that include Network KPI Weight Distribution and aggregation of User Level CEI Estimates 460 and/or Network Level KPIs 472 per service. Again, Pre-Defined User Input 456 is forwarded to the SQI Estimator 480 from the expert regarding KPI Performance Thresholds 454. Experts include domain experts, network engineers, managers, etc. SQI Estimator 480 calculates or estimates Network Level SQI Estimates 490 in two ways. First, SQI Estimator 480 uses the Data Input 462 of User Level CEI Estimates 460 from the CEI Estimator 460 and applies Machine Learning to estimate the Network Level SQI Estimates 490. Alternatively, SQI Estimator 480 uses the User Level KPIs aggregated at the network level to produce the Network Level KPIs 472 and applies Machine Learning to calculate Network SQI Estimates 490.

Figure 5:
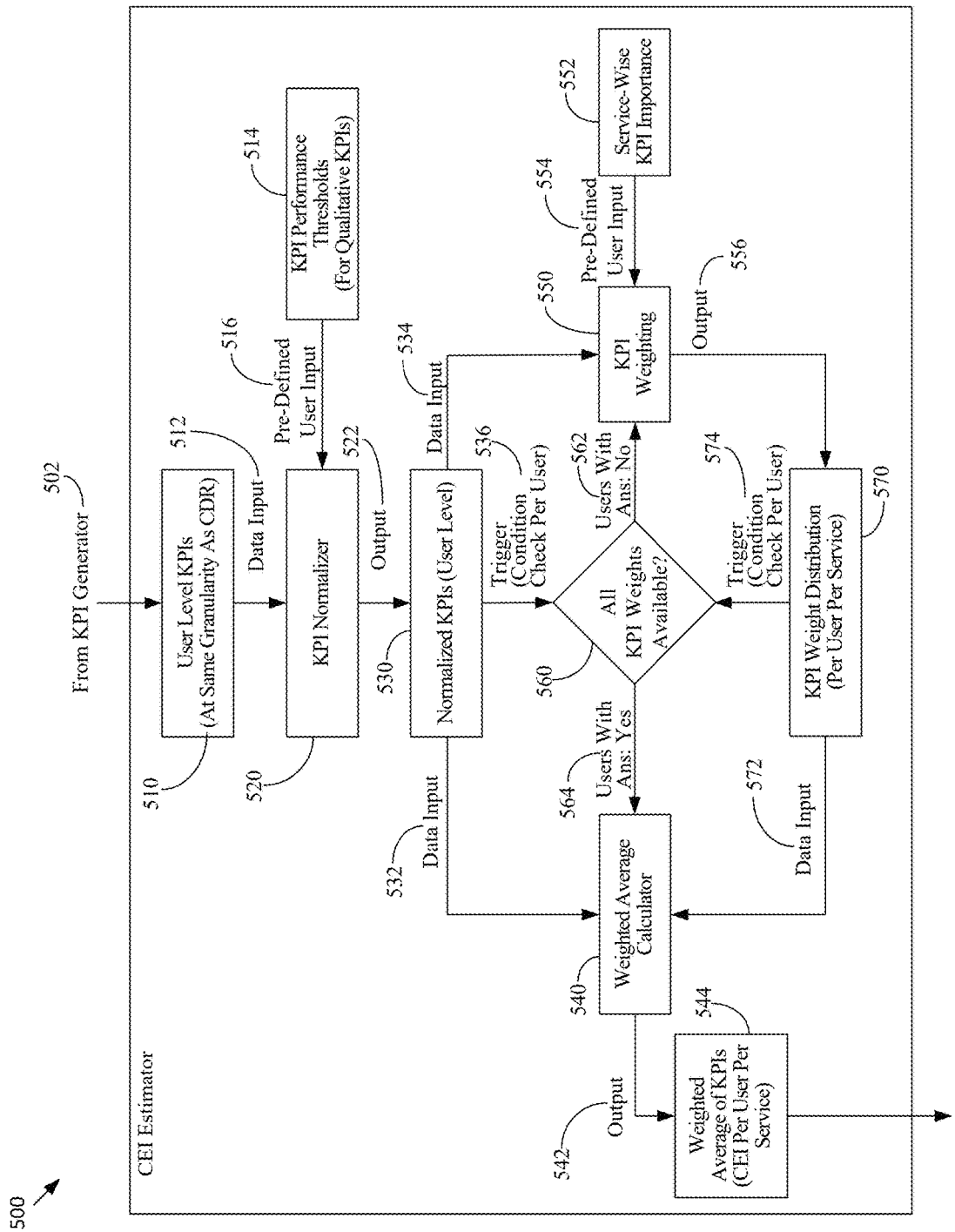
FIG. 5 is a block diagram of a CEI Estimator according to at least one embodiment.

FIG. 5 is a block diagram of a CEI Estimator 500 according to at least one embodiment.

In FIG. 5, CEI Estimator 500 implements a KPI Normalizer that normalizes KPI values in a performance Range between 0 and 100%. CEI Estimator 500 receives User Level KPIs 510 from KPI Generator 502, which was illustrated earlier with respect to KPI Generator 420 providing User Level KPIs 440 to CEI Estimator 450 in FIG. 4. User Level KPIs 510 are provided as Data Input 512 to KPI Normalizer 520. KPI Performance Thresholds (for Qualitative KPIs) 514 are also provided as Pre-Defined User Input 516 to KPI Normalizer 520. KPI Normalizer 520 provides as Output 522 Normalized KPIs 530. Qualitative KPIs are able to be scaled directly in between 0 to 100% using the KPI Performance Thresholds 514, e.g., Success-rate or Failure rate. Quantitative KPIs do not have any Performance Threshold are include Release Cause Count, Data Traffic Throughput, etc. KPI Normalizer 520 normalizes qualitative and quantitative KPI values in performance Range (between 0 and 100%). Normalized KPIs 530 are provided as Data Input 532 to Weighted Averaging operation 540 and as Data Input 534 to KPI Weighting operation 550. KPI Weighting operation 550 receives Service-Wise KIP Importance 552 as Pre-Defined User Input 554. Trigger 536 is provided for Decision 560. Decision 560 determines whether KPI Weights are available. In response to KPI Weights not being available 562, KPI Weighting operation 550 is triggered and provides Output 556 to KPI Weight Distribution 570. KPI Weighting operation 550 provides as Output estimates of KPI weight distribution for any service. KPI Weight Distribution 570 is provided as Data Input 572 to Weighted Averaging operation 540. KPI Weight Distribution 570 provides Trigger 574 to Decision 560 for again determining whether KPI Weights are available. In response to KPI Weights being available 564, Weighted Average operation 550 provides an Output 542 of Weighted Average of KPIs 544.

Figure 6:
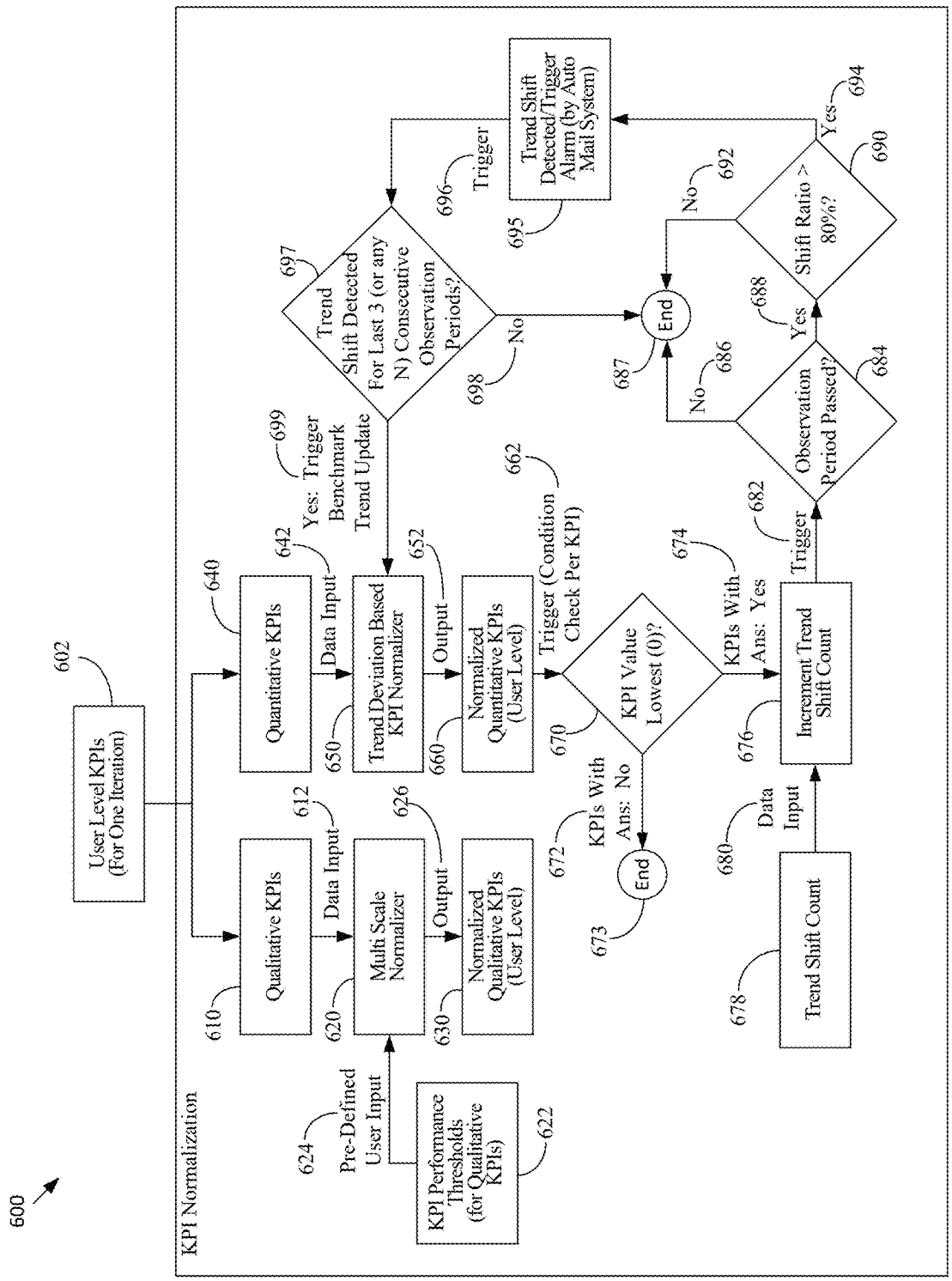
FIG. 6 is a block diagram of KPI Normalizer according to at least one embodiment.

FIG. 6 is a block diagram of KPI Normalizer 600 according to at least one embodiment.

In FIG. 6, User Level KPIs 602 are provided to KPI Normalizer 600. KPI Normalizer 600 receives and normalizes Qualitative KPI values 610 and Quantitative KPI values 640 in a performance Range between 0 and 100%.

Qualitative KPIs 610 are provided as Data Input 612 to Multi Scale Normalizer 620. KPI Performance Thresholds 622 for Qualitative KPIs 610 are provided as Pre-Defined User Input 624 to Multi Scale Normalizer 620, which normalizes Qualitative KPIs 610 based on multiple thresholds. The KPI Performance Thresholds 622 for the Qualitative KPIs 610 are provided by the experts, such as domain experts, network engineers, managers, etc. Multi Scale Normalizer 620 normalizes the Qualitative KPI values 610 using the KPI Performance Thresholds 622. Qualitative KPI values 610 are values such as good or bad, which the domain experts have knowledge of such values. Qualitative KPI values 610 are not only based on knowledge of domain experts, but also are based on the expectation of the management. For example, network engineers or managers provide an indication that a predetermined Qualitative KPI value 610 is to be within a predetermined range, e.g., 90%. The expectation of network engineers or managers is that the predetermined Qualitative KPI value 610 is to be equal to or greater than 90% because this range is considered to provide a predetermined level of performance or is critical to operation of the network. The KPI Performance Thresholds 622 thus depend on the perspective of the network engineer and what is considered good or bad. Accordingly, the KPI Performance Thresholds 622 are received and Multi Scale Normalizer 620 normalizes the Qualitative KPI values 610 based on the KPI Performance Thresholds 622. Normalized Qualitative KPI values are generalized, and are able to be changed by modifying the KPI Performance Thresholds 622. The Multi Scale Normalizer 620 automatically adapts to changes. Multi Scale Normalizer 620 normalizes the Qualitative KPI values 610 based on a KPI value being within a range of the KPI Performance Thresholds 622.

Multi Scale Normalizer 620 provides as Output 626 Normalized Qualitative KPIs 630 at the user level. User Level Quantitative KPIs 640 are provided as Data Input 642 to Trend Deviation Based KPI Normalizer 650. The insight provided by the KPI Performance Thresholds 622 for Qualitative KPIs 610 is not applicable to User Level Quantitative KPI values 640. Thresholds are not available because User Level Quantitative KPIs 640 are based on trend data. Benchmark Trend Update 699 represents a benchmark trend shift in Quantitative KPI values. The Quantitative KPI values 640 are able to shift at any time. The Benchmark Trend Update 699 is used by Trend Deviation Base KPI Normalizer 650 to estimate the thresholds and to map those values in between 0 to 100. Thus, Trend Deviation Based KPI Normalizer 650 normalizes User level Quantitative KPIs based on their deviations from the network level Benchmark Trend Update 699.

Trend Deviation Based KPI Normalizer 650 provides as Output 652 Normalized Quantitative KPIs 660 (at the user level). However, there are factors that affect Trend Deviation Based KPI Normalizer 650. The Output 652 of Normalized Quantitative KPIs 660 initiates a Trigger 662, wherein a Decision 670 determines whether a KPI is a predetermined KPI lowest value (0).

Values not having KPI lowest value (0) result in an answer of "No" 672 and the normalization activity Ends 673. The Normalized Quantitative KPI Values 660 and the Normalized Qualitative KPI Values 630 are provided for determination of Customer Experience Index (CEI) Estimates of Weighted Average of KPIs (CEI Per User Per Service) as shown in FIG. 5.

In response to the KPI values being Zero (0) 674, Normalized Quantitative KPI values 660 are provided to Increment Trend Shift Count 676. A variable called Trend Shift Count 678 is provided as Data input 680 to Increment Trend Shift Count 676. Trend Shift Count 678 is a number of iterations with normalized KPI value being equal to Zero (0).

Once the Increment Trend Shift Count 676 is incremented, Trigger 682 is issued and a check is performed to determine whether an Observation Period Has Passed 684. Thus, for the Trend Shift Count Increments 676, the observation period is checked to determine whether the Observation Has Passed 684. The observation period is able to be 1 day, or a certain period of days.

In response to the Observation Period Not Passing 686, the process Ends 687, e.g., nothing happens because the KPI value could be 0 by nature. In response to the Observation Period Being Passed 688, a check is made whether the Shift Ratio is greater than a predetermined shift ratio value 690, such as 80%. Shift Ratio is the ratio of Trend Shift Count 678 with respect to Total Number of Iterations (during Observation Period for any N, e.g., 1 or 2 or 3 consecutive days). In response to the Shift Ratio not being greater than 80% 692, the process Ends 687.

In response to the Shift Ratio being greater than 80% 694, a Trend Shift is detected 694. A Shift Ratio greater than 80% results in a Trend Shift Detected. Shift Ratio is a ratio of Trend Shift Count 678 with respect to Total Number of Iterations, e.g., $$\frac{\text{Trend Shift Count}}{\text{Total Number of Iterations}}.$$

For example, the Trend Shift Count 678 is able to be 20, and the Observation Period is able to be 1 day. Thus, within 1 day, 24 iterations are able to occur and within that 24 iterations, 20 zeros could occur. In response to having 20 zeros, the KPI lowest value of 20 occurs within this 24 hour range. Then, the Trend Shift Ratio is above 80%, i.e., $$\frac{20}{24} = 83.33\%.$$

Thus, the trend data does not for fall within the expected bandwidth. However, the Normalized Quantitative KPIs 660 are able to be outside of the expected trends zone or band because the Normalized Quantitative KPIs 660 are legitimately bad for one or two iterations. In response to the KPI values in many iterations within the observation range being out of band, a Trend Shift is Detected 694, and the current trend is no longer following within the predefined band. In response to the Trend Shift being Detected 694, an Alarm is Triggered and sent by the Auto Mail System 695. KPI Trend Shift events are able to be automatically emailed to stakeholders or other experts, such as domain experts, network engineers, managers, etc.

Trigger 696 is issued and Decision 697 determines whether the Trend Shift has been Detected For the Last 3 (or any N) Consecutive Observation Periods. The trend deviation is able to be detected due to an accidental trend deviation, where there is a significant incident that occurs. For example, people are able to be located in a crowded location or gathered in an area where some specific event is happening within 1 day. However, after 1 day that event ends and traffic reverts back to usual levels. In that scenario, a Trend Shift was detected but the Trend Shift is a limited incident. Thus, in response to the Trend Shift not being Detected For the Last 3 (or any N) Consecutive Observation Periods 698, the Quantitative Normalization process Ends 698.

In contrast, in response to the trend shift being detected for several consecutive observation periods, such as for 2-3 observation periods, the general trend is identified as having shifted. Thus, in response to the Trend Shift having been Detected For the Last 3 (or any N) Consecutive Observation Periods, a Benchmark Trend Update 699 is generated and provided to the Trend Deviation Based KPI Normalizer 650 to generate Normalized Quantitative KPIs 660 that are adjusted based on the Benchmark Trend Update 699.

Figure 7:
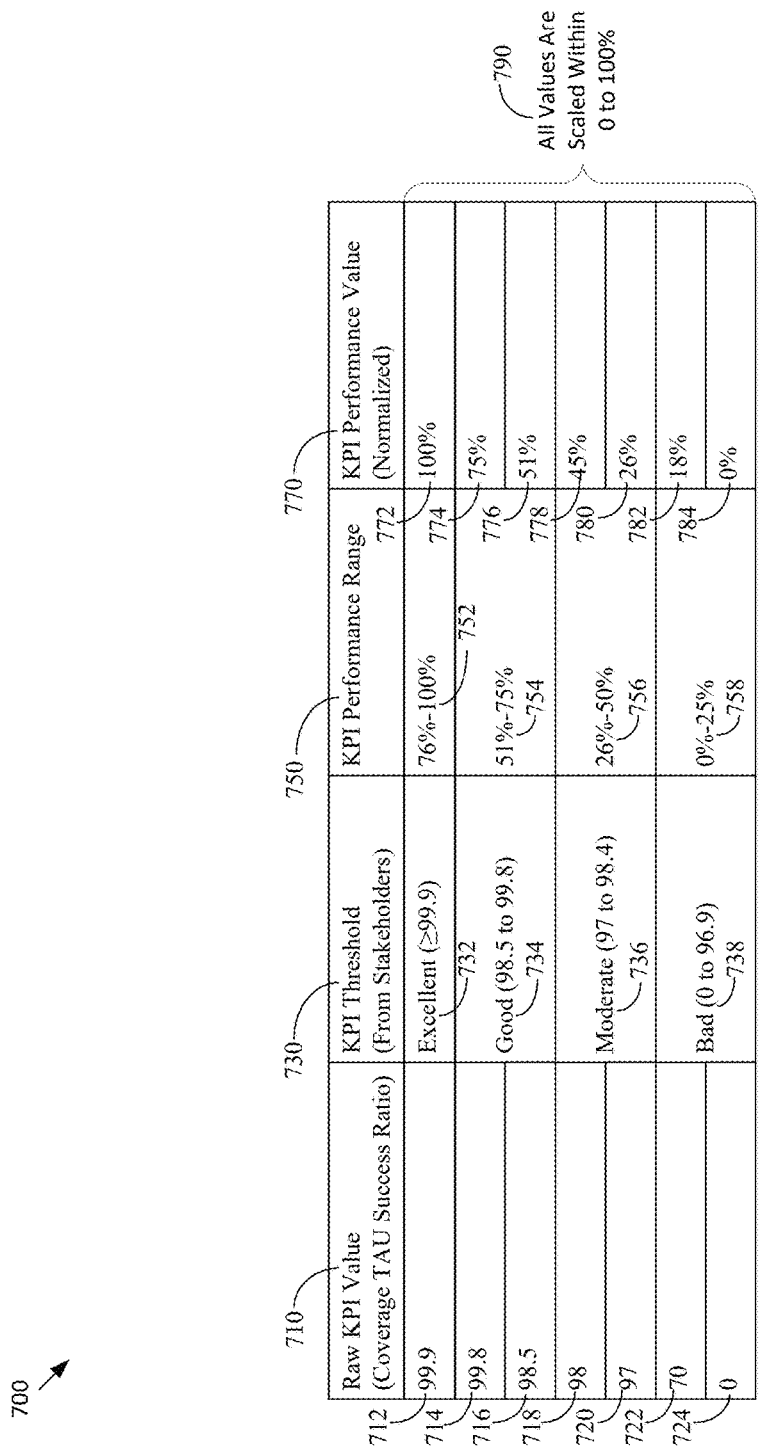
FIG. 7 is a table showing the Normalization of Raw KPI Values according to at least one embodiment.

FIG. 7 is a table 700 showing the Normalization of Raw KPI Values according to at least one embodiment.

In FIG. 7, the first column is the Raw KPI Value for Coverage TAU Success Ratio 710. Next, a value for KPI Thresholds 730 is shown. The value for KPI Thresholds 730 is provided by Stakeholders. Next, KPI Thresholds 730 are transformed into KPI Performance Range 750, Then, Normalized KPI Performance Values 770 are shown.

As shown in FIG. 7, the Raw KPI Value for Coverage TAU Success Ratio 710 range from 0 to 99.9. For a Raw KPI Value 710 of 99.9 712, the KPI Threshold 730 is Excellent 732, which falls within the KPI Performance Range 750 of 76% to 100% 752. The Normalized KPI Performance Value 770 is 100% 772.

For a Raw KPI Value 710 of 99.8 714 and 98.5 716, the KPI Threshold 730 is Good 734, which falls within the KPI Performance Range 750 of 51% to 75% 754. The Normalized KPI Performance Value 770 is 75% 774 and 51% 776, respectively.

For a Raw KPI Value 710 of 98 718 and 97 720, the KPI Threshold 730 is Moderate 736, which falls within the KPI Performance Range 750 of 26% to 50% 756. The Normalized KPI Performance Value 770 is 45% 778 and 26% 780, respectively.

For a Raw KPI Value 710 of 70 722 and 0 724, the KPI Threshold 730 is Bad 738, which falls within the KPI Performance Range 750 of 0% to 25% 758. The Normalized KPI Performance Value 770 is 18% 782 and 0% 784, respectively.

Accordingly, FIG. 7 shows that the RAW KPI Values 710 are normalized within a range of 0% to 100% 790.

Figure 8:
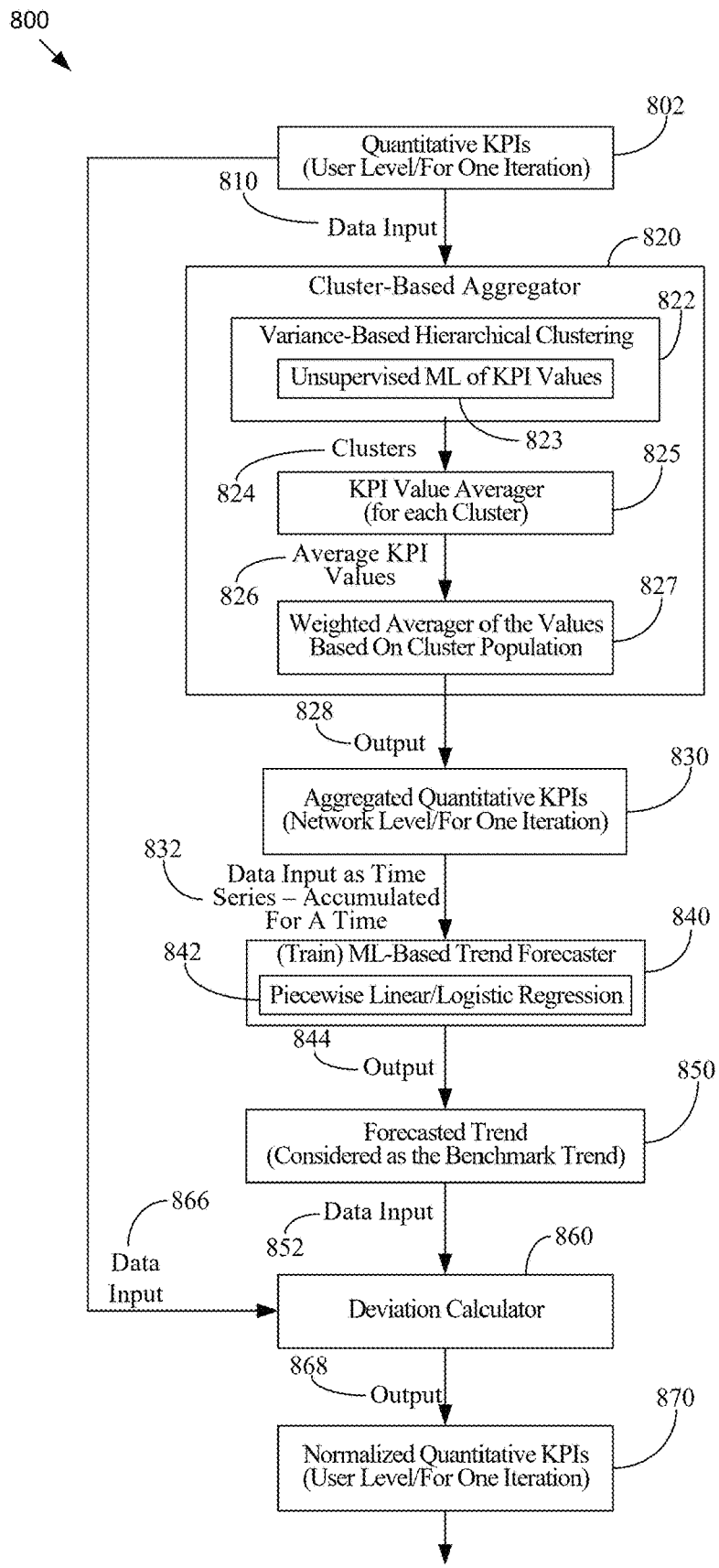
FIG. 8 illustrates a Trend Deviation-Based Quantitative Key Performance Indictors (KPI) Normalizer according to at least one embodiment.

FIG. 8 illustrates a Trend Deviation-Based Quantitative Key Performance Indictors (KPI) Normalizer 800 according to at least one embodiment.

In FIG. 8, Trend Deviation-Based Quantitative Key Performance Indictors (KPI) Normalizer 800 normalizes User Level Quantitative KPIs 802 based on deviation from the Network Level Benchmark Trend. The Normalized Quantitative KPI values 870 are provided as an output of User Level CEI Estimates 460 of CEI Estimator 450 as shown in FIG. 4. CEI Estimator 450 as shown in FIG. 4 includes KPI Normalizer 520 as shown in FIG. 5. KPI Normalizer 520 as shown in FIG. 5 includes Multi Scale Normalizer 620 for User Level Qualitative KPIs 610 and Trend Deviation-Based KPI Normalizer 800 for normalizing Quantitative KPIs as described herein with respect to FIG. 8.

As shown in FIG. 8, User Level Quantitative Key Performance Indictor (KPI) values 802 are passed as Data Input 810 to Cluster Based Aggregator 820. Aggregation is performed at the Cluster Based Aggregator 820 because the Data Input 810 is User Level data but the output is Network Level data. For example, there is able to be 5,000,000 User Level Quantitative KPIs 802 provided as Data Input 810 for an iteration, but the Output 828 of the Cluster Based Aggregator 820 is one value (Network Level) for those 5,000,000 users, wherein the User Level Quantitative KPIs values 802 are aggregated at the network level.

However, a simple average does not always provide good estimation of the Network Level values. Thus, the User Level Quantitative KPIs 802 at an iteration are not averaged to get the Network Level values. Cluster-Based Aggregator 820 does not average User Level Quantitative KPIs 802 because the User Level Quantitative KPIs 802 are able to include outlier values. For example, 20% of the values are able to be outliers within the 5,000,000 User Level User Level Quantitative KPIs 802 provided as Data Input 810 for an iteration. The outliers are able to have an impact on the average. Thus, outliers are able to be removed and not considered. However, those outlier values are to be considered in the data. Therefore, the outlier values are given less significance, but still considered. The Cluster-Based Aggregator 820

Cluster-Based Aggregator 820 performs cluster-based aggregation of the User Level Quantitative KPIs by applying Variance-Based Hierarchical Clustering of the User Level Quantitative KPI using Unsupervised Machine Learning (ML) 823. the User Level Quantitative KPI 802 using Unsupervised Machine Learning (ML) 823. The User Level Quantitative KPI 802 are clustered based on the variance in that data. User Level Quantitative KPI values 802 within a close range are clustered together, and whenever there is a significant gap, e.g., variance of 2% or 3%, those User Level Quantitative KPI values 802 are split and put in a separate cluster.

Then, the Clusters 824 from the Variance-Based Hierarchical Clustering 822 is provided to a KPI Averager 825 that determines an Average KPI value for a Cluster 824. KPI values for a Cluster 824 are averaged because in a Cluster 824 all the values are almost the same. The Average KPI values 826 for a Cluster 824 is then provided to a Weighted Averager 827 that determines a Weighted Average of the Average KPI values 826 based on Clustering Population. The Weight of a Cluster 824 is the Population of that cluster. The Output 828 of the Weighted Averager 827 is the Cluster Based Aggregation of Quantitative KPI values 830 that transforms the User Level Quantitative KPIs values 802 to Network Level values.

The Aggregated Quantitative KPIs 830 at the Network Level are collected for a predetermined period of time, e.g., 1 month or longer. This produces Data Input 832 as a Time Series Accumulated for the Predetermined Period of Time. The Aggregated Quantitative KPIs 830 at the Network Level that has been accumulated for the predetermined period of time is provided as Data Input 832 to train an ML-Based Trend Forecaster 840. For example, the ML-Based Trend Forecaster 840 is able to be based on Piecewise Linear Regression or Logistic Regression 842. The Output 844 is a Forecasted Trend 850 representing the general trend for the current period. For example, the Input Data 832 to ML-Based Trend Forecaster 840 is able to be a sign wave-like structure or any type of curve that has some seasonality in the data. The Forecasted Trend 850 is obtained from using the ML-Based Trend Forecaster 840.

The Forecasted Trend 850 is a generalized representation of how the trend looks at a Network Level. The Forecasted Trend 850 is provided at Data Input 852 to a Deviation Calculator 860. The Deviation Calculator 860 determines how the User Level Quantitative KPI values 866 deviate from the Forecasted Trend 850 at the Network Level. The more the User Level Quantitative KPI values deviate from the Forecasted Trend 850, the worse the Forecasted Trend 850 is. The Forecasted Trend 850 is considered the Benchmark Trend.

In response to the User Level Quantitative KPI values 866 being associated with a Failure Count, Stakeholders are not interested in a failure count that is trending in the downward direction because a downward direction is an indicator of good performance. However, a Failure Count that is in the upward direction is an indication of deteriorating performance.

For example, in response to the User Level Quantitative KPI values 866 being a Success Count, only one direction is relevant (downward direction indicating less success), and in response to being a Failure Count, the direction is able to be in the opposite direction (upward direction indicating greater failure). For Throughput, there is no direction and a deviation from the trend value is considered bad.

The direction of deviation is based on the difference between (y) the User Level Quantitative KPI values 866 and (y*) the Forecasted KPI Value (Forecasted Trend 850 from the Benchmark Trend) for Network Level. In response to a trend that has an Upper Bound ($y_{upper}$) and a Lower Bound ($y_{lower}$), the ratio of that deviation is checked. Deviation Calculator 860 determines how much is the deviation of the value y (the User Level Quantitative KPIs 866) from y* (the Predicted or Forecasted Trend 850) compared to the overall band of the trend itself. The larger this difference is from the overall Forecasted Trend 850, the larger anomalies are and the larger the anomaly in the performance.

In response to the KPIs with an Upward Direction, only the Upward Deviation is considered. The Deviation Calculator 860 determines whether y−y* is positive or negative. In response to y−y* being positive, the Normalized KPI for one user is $$\left(1 - \left\{\frac{(y - y*)}{[N(y_{upper} - y*)]}\right\}\right)100\%,$$

and in response to y−y* being negative, the Normalized KPI for one user is zero (0).

In response to the KPIs with a Downward Direction, only the Downward Deviation is considered. The Deviation Calculator 860 determines whether y*−y is positive or negative. In response to y*−y being positive, the Normalized KPI for one user is $$\left(1 - \left\{\frac{(y* - y*)}{[N(y* - y_{lower})]}\right\}\right)100\%,$$

and in response to y*−y being negative, negative, the Normalized KPI for one user is zero (0).

For KPI values with No Direction, up and downward deviation is considered. The KPI Normalization formula becomes Normalized KPI for one user $$\left(1 - \left\{\frac{[abs(y - y*)]}{(N[abs(y_{upper} - y_{lower})]}\right\}\right)100\%.$$

Here, the Normalized KPI is 0% or 100% as shown as follows.

In response to abs(y−y*)=0, then the output of Normalized KPI is 100%. For example, $$\left(1 - \frac{0}{N[abs(y_{upper} - y_{lower})]}\right)100\% = 100\%.$$

In response to abs(y−y*)≥N[abs($y_{upper}$−$y_{lower}$)], then output (Normalized KPI) is 0%, For example, $$\left(1 - \frac{3}{2}\right)100\% = 0\%.$$

Here any Normalized KPI Output>100% is considered 100%.

The Output 868 of the Deviation Calculator 860 is the Normalized Quantitative KPI value 870. The Normalized Quantitative KPI value 870 is provided as an Output of the Trend Deviation-Based KPI Normalizer 800. Deviation of the User Level Quantitative KPI values 866 calculated from the Benchmark (Forecasted) Trend 850 is considered as the Normalized Quantitative KPI values 870, which falls within a range of 0 to 100%. The Normalized Quantitative KPI values 870 are provided as an output of User Level CEI Estimates of a CEI Estimator (for example, see FIGS. 4 and 5).

Figure 9:
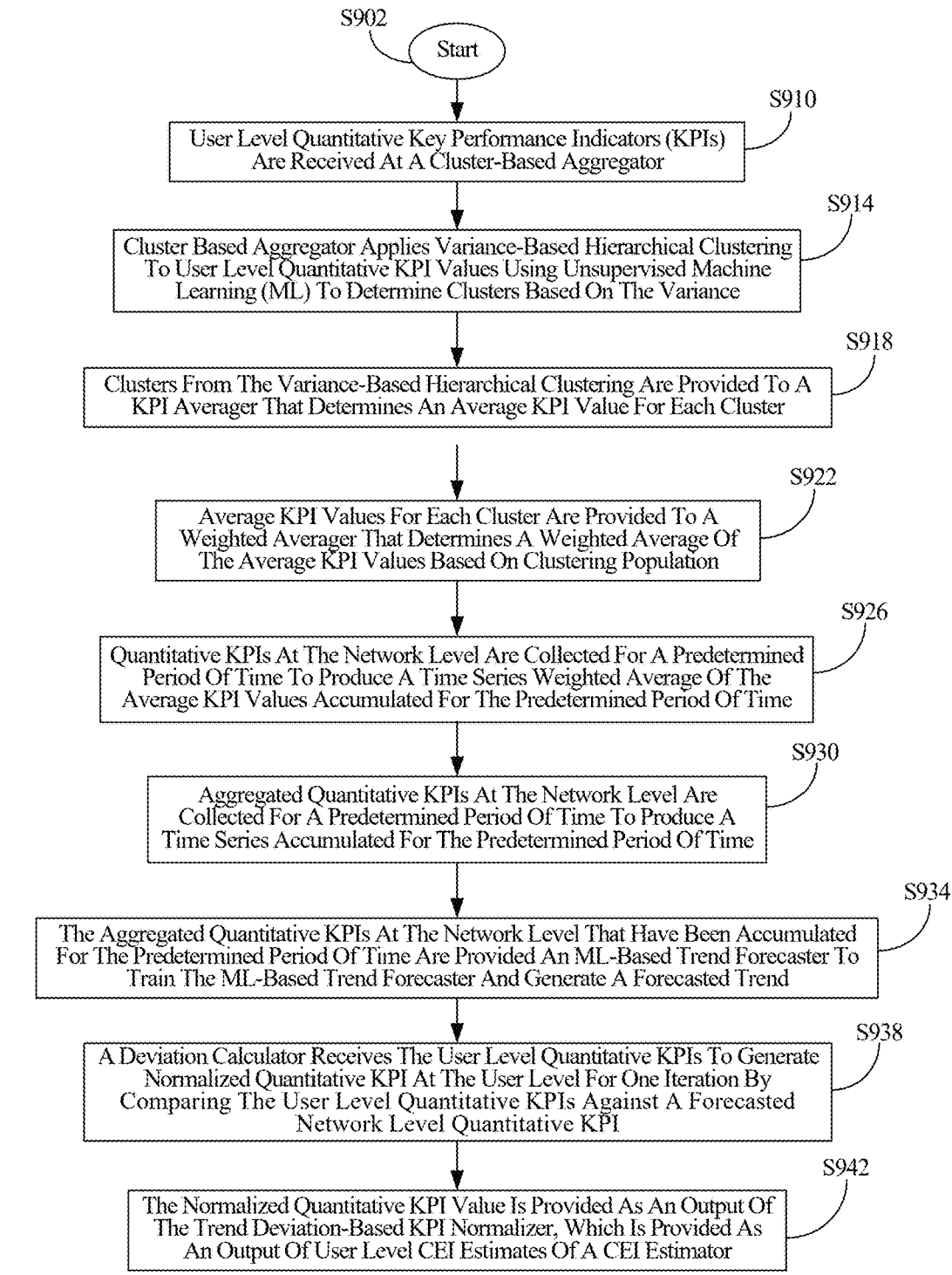
FIG. 9 is a flowchart of a method for providing a Trend Deviation-Based Quantitative Key Performance Indictors (KPI) Normalizer for a Smart Service Analyzer according to at least one embodiment.

FIG. 9 is a flowchart 900 of a method for providing a Trend Deviation-Based Quantitative Key Performance Indictors (KPI) Normalizer for a Smart Service Analyzer according to at least one embodiment.

In FIG. 9, the process starts S902 and User Level Quantitative Key Performance Indicator (KPI) values are received at a Cluster-Based Aggregator S910. Referring to FIG. 8, User Level Quantitative Key Performance Indictor (KPI) values 802 are passed as Data Input 810 to Cluster Based Aggregator 820.

Cluster Based Aggregator performs cluster-based aggregation of the User Level Quantitative KPIs by applying Variance-Based Hierarchical Clustering of the User Level Quantitative KPI values using Unsupervised Machine Learning (ML) to determine clusters based on the variance in the User Level Quantitative KPI values S914. Referring to FIG. 8, the Cluster-Based Aggregator 820 performs cluster-based aggregation of the User Level Quantitative KPIs by applying Variance-Based Hierarchical Clustering of the User Level Quantitative KPI values using Unsupervised Machine Learning (ML) 823. The User Level Quantitative KPI values 802 are clustered based on the variance in the User Level Quantitative KPI values 802. User Level Quantitative KPI values 802 within a close range are clustered together, and whenever there is a significant gap, e.g., variance of 2% or 3%, those User Level Quantitative KPI values 802 are split and put in a separate cluster.

Clusters from the Variance-Based Hierarchical Clustering are provided to a KPI Averager that determines an Average KPI value for a Cluster S918. Referring to FIG. 8, the Clusters 824 from the Variance-Based Hierarchical Clustering 822 is provided to a KPI Averager 825 that determines an Average KPI value for a Cluster 824. KPI values for a Cluster 824 are averaged because in a Cluster 824 all the values are almost the same.

Average KPI values for a Cluster are provided to a Weighted Averager that determines a Weighted Average of the Average KPI values based on Clustering Population S922. Referring to FIG. 8, the Average KPI values 826 for a Cluster 824 is then provided to a Weighted Averager 827 that determines a Weighted Average of the Average KPI values 826 based on Clustering Population. The Weight of each Cluster 824 is the Population of that cluster.

Cluster Based Aggregation of Quantitative KPI values are provided at an Output of the Weighted Averager to transform the Weighted Average of the Average KPI values to Network Level values S926. Referring to FIG. 8, the Output 828 of the Weighted Averager 827 is the Cluster Based Aggregation of Quantitative KPI values 830 that transforms the User Level Quantitative KPIs values 802 to Network Level values.

Aggregated Quantitative KPIs at the Network Level are collected for a predetermined period of time to produce a Time Series Accumulated for the Predetermined Period of Time S930. Referring to FIG. 8, the Aggregated Quantitative KPIs 830 at the Network Level are collected for a predetermined period of time, e.g., 1 month or longer. This produces Data Input 832 as a Time Series Accumulated for the Predetermined Period of Time.

The Aggregated Quantitative KPIs at the Network Level that have been accumulated for the predetermined period of time are provided an ML-Based Trend Forecaster to train the ML-Based Trend Forecaster and generate a Forecasted Trend S934. Referring to FIG. 8, the Aggregated Quantitative KPIs 830 at the Network Level that has been accumulated for the predetermined period of time is provided as Data Input 832 to train an ML-Based Trend Forecaster 840. For example, the ML-Based Trend Forecaster 840 is able to be based on Piecewise Linear Regression or Logistic Regression 842. The Output 844 is a Forecasted Trend 850 representing the general trend for the current period. For example, the Input Data 832 to ML-Based Trend Forecaster 840 is able to be a sign wave-like structure or any type of curve that has some seasonality in the data. The Forecasted Trend 850 is obtained from using the ML-Based Trend Forecaster 840. The Forecasted Trend 850 is a generalized representation of how the trend looks at a Network Level.

A Deviation Calculator receives the User Level Quantitative KPIs to generate Normalized Quantitative KPIs at the User Level for one iteration by comparing the User Level Quantitative KPIs against a forecasted Network Level Quantitative KPI S938. Referring to FIG. 8, the Forecasted Trend 850 is provided to a Deviation Calculator 860. The Deviation Calculator 860 determines how the User Level Quantitative KPI values 866 deviate from the Forecasted Trend 850 at the Network Level. The more the User Level Quantitative KPI values deviate from the Forecasted Trend 850, the worse the Forecasted Trend 850 is. The Forecasted Trend 850 is considered the Benchmark Trend. The direction of deviation is based on the difference between (y) the User Level Quantitative KPI values 866 and (y*) the Forecasted KPI Value (Forecasted Trend 850 from the Benchmark Trend) for Network Level. Deviation Calculator 860 determines how much is the deviation of the value y (the User Level Quantitative KPIs 866) from y* (the Predicted or Forecasted Trend 850) compared to the overall band of the trend itself. The larger this difference is from the overall Forecasted Trend 850, the larger anomalies are and the larger the anomaly in the performance. The Output 868 of the Deviation Calculator 860 is the Normalized Quantitative KPI value 870. In response to the KPIs with an Upward Direction, only the Upward Deviation is considered. The Deviation Calculator 860 determines whether y−y* is positive or negative. In response to y−y* being positive, the Normalized KPI for one user is $$\left(1 - \left\{\frac{(y-y*)}{[N(y_{upper}-y*)]}\right\}\right)100\%,$$

and in response to y−y* being negative, the Normalized KPI for one user is zero (0). In response to the KPIs with a Downward Direction, only the Downward Deviation is considered. The Deviation Calculator 860 determines whether y*−y is positive or negative. In response to y*−y being positive, the Normalized KPI for one user is $$\left(1 - \left\{\frac{(y*-y)}{[N(y*-y_{lower})]}\right\}\right)100\%,$$

and in response to y*−y being negative, negative, the Normalized KPI for one user is zero (0). For KPI values with No Direction, up and downward deviation is considered. The KPI Normalization formula becomes Normalized KPI for one user=

$$\left(1 - \left\{\frac{[abs(y-y*)]}{(N[abs(y_{upper}-y_{lower})]}\right\}\right)100\%.$$

Here, the Normalized KPI is 0% or 100% as shown as follows. In response to abs(y−y*)=0, then the output of Normalized KPI is 100%. For example, $$\left(1 - \frac{0}{N[abs(y_{upper}-y_{lower})]}\right)100\% = 100\%.$$

In response to abs(y−y*)≥N[abs(y$_{upper}$−y$_{lower}$)], then output (Normalized KPI) is 0%, For example, $$\left(1 - \frac{3}{2}\right)100\% = 0\%.$$

Here any Normalized KPI Output>100% is considered 100%.

The Normalized Quantitative KPI value is provided as an Output of the Trend Deviation-Based KPI Normalizer, which is provided as an output of User Level CEI Estimates of a CEI Estimator S942. Referring to FIG. 8, The Normalized Quantitative KPI value 870 is provided as an Output of the Trend Deviation-Based KPI Normalizer 800. Deviation of the User Level Quantitative KPI values 866 calculated from the Benchmark (Forecasted) Trend 850 is considered as the Normalized Quantitative KPI values 870, which falls within a range of 0 to 100%. The Normalized Quantitative KPI values 870 are provided as an output of User Level CEI Estimates of a CEI Estimator (for example, see FIGS. 4 and 5).

At least one embodiment of the method for providing a Trend Deviation-Based Quantitative Key Performance Indictors (KPI) Normalizer for a Smart Service Analyzer includes receiving User Level Quantitative Key Performance Indictors (KPIs) at a Cluster Based Aggregator, performing cluster-based aggregation of the User Level Quantitative KPIs to generate Network Level Quantitative KPIs, determining a forecasted trend based on the Network Level Quantitative KPIs, and processing the User Level Quantitative KPIs by comparing against a forecasted Network Level Quantitative KPI to generate Normalized Quantitative KPIs at the User Level based on the forecasted trend, wherein the Normalized Quantitative KPIs at the User Level include a deviation from the forecasted trend.

Figure 10:
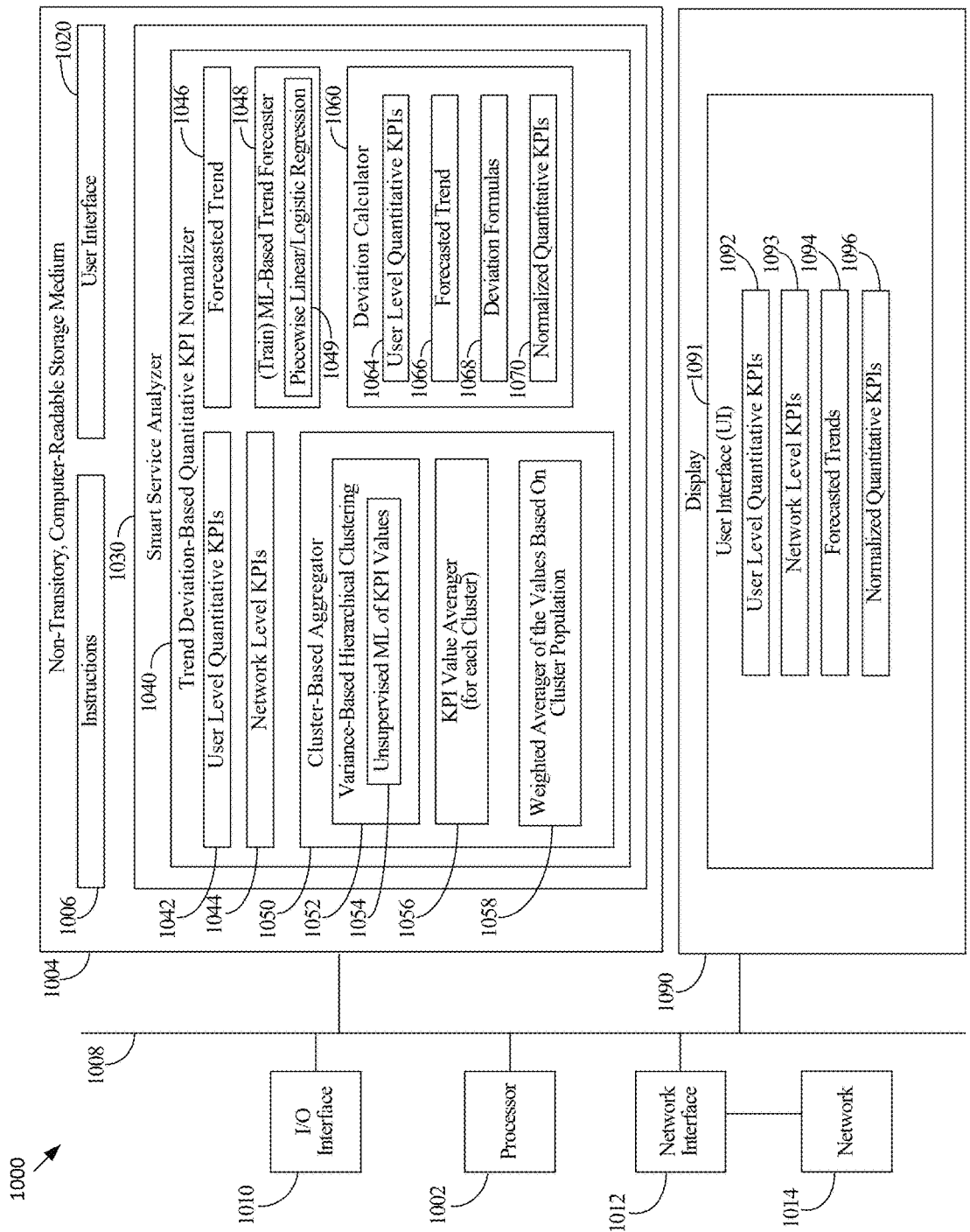
FIG. 10 is a high-level functional block diagram of a processor-based system according to at least one embodiment.

FIG. 10 is a high-level functional block diagram of a processor-based system 1000 according to at least one embodiment.

In at least one embodiment, processing circuitry 1000 provides a Trend Deviation-Based Quantitative Key Performance Indictors (KPI) Normalizer for a Smart Service Analyzer. Processing circuitry 1000 implements a Trend Deviation-Based Quantitative KPI Normalizer for a Smart Service Analyzer using Processor 1002. Processing circuitry 1000 also includes a Non-Transitory, Computer-Readable Storage Medium 1004 that is used to implement a Trend Deviation-Based Quantitative KPI Normalizer for a Smart Service Analyzer. Non-Transitory, Computer-Readable Storage Medium 1004, amongst other things, is encoded with, i.e., stores, Instructions 1006, i.e., computer program code, that are executed by Processor 1002 causes Processor 1002 to perform operations for providing a Trend Deviation-Based Quantitative KPI Normalizer for a Smart Service Analyzer. Execution of Instructions 1006 by Processor 1002 represents (at least in part) an application which implements at least a portion of the methods described herein in accordance with one or more embodiments (hereinafter, the noted processes and/or methods).

Processor 1002 is electrically coupled to Non-Transitory, Computer-Readable Storage Medium 1004 via a Bus 1008. Processor 1002 is electrically coupled to an Input/Output (I/O) Interface 1010 by Bus 1008. A Network Interface 1012 is also electrically connected to Processor 1002 via Bus 1008. Network Interface 1012 is connected to a Network 1014, so that Processor 1002 and Non-Transitory, Computer-Readable Storage Medium 1004 connect to external elements via Network 1014. Processor 1002 is configured to execute Instructions 1006 encoded in Non-Transitory, Computer-Readable Storage Medium 1004 to cause processing circuitry 1000 to be usable for performing at least a portion of the processes and/or methods. In one or more embodiments, Processor 1002 is a Central Processing Unit (CPU), a multi-processor, a distributed processing system, an Application Specific Integrated Circuit (ASIC), and/or a suitable processing unit.

Processing circuitry 1000 includes I/O Interface 1010. I/O interface 1010 is coupled to external circuitry. In one or more embodiments, I/O Interface 1010 includes a keyboard, keypad, mouse, trackball, trackpad, touchscreen, and/or cursor direction keys for communicating information and commands to Processor 1002.

Processing circuitry 1000 also includes Network Interface 1012 coupled to Processor 1002. Network Interface 1012 allows processing circuitry 1000 to communicate with Network 1014, to which one or more other computer systems are connected. Network Interface 1012 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 1000 is configured to receive information through I/O Interface 1010. The information received through I/O Interface 1010 includes one or more of instructions, data, design rules, libraries of cells, and/or other parameters for processing by Processor 1002. The information is transferred to Processor 1002 via Bus 1008. Processing circuitry 1000 is configured to receive information related to a User Interface (UI) through I/O Interface 1010. The information is stored in Non-Transitory, Computer-Readable Storage Medium 1004 as UI 1020.

In one or more embodiments, one or more Non-Transitory, Computer-Readable Storage Medium 1004 having stored thereon Instructions 1006 (in compressed or uncompressed form) that may be used to program a computer, processor, or other electronic device) to perform processes or methods described herein. The one or more Non-Transitory, Computer-Readable Storage Medium 1004 include one or more of an electronic storage medium, a magnetic storage medium, an optical storage medium, a quantum storage medium, or the like.

For example, the Non-Transitory, Computer-Readable Storage Medium 1004 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 1004 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 1004 stores Instructions 1006 configured to cause Processor 1002 to perform at least a portion of the processes and/or methods for providing a Trend Deviation-Based Quantitative KPI Normalizer for a Smart Service Analyzer. In one or more embodiments, Non-Transitory, Computer-Readable Storage Medium 1004 also stores information, such as algorithm which facilitates performing at least a portion of the processes and/or methods for providing a Trend Deviation-Based Quantitative KPI Normalizer for a Smart Service Analyzer.

Accordingly, in at least one embodiment, Processor 1002 executes Instructions 1006 stored on the one or more Non-Transitory, Computer-Readable Storage Medium 1004 to implement a Trend Deviation-Based Quantitative KPI Normalizer 1040 for a Smart Service Analyzer 1030. Processing 1002 executes Instructions 1006 in Non-Transitory, Computer-Readable Medium to implement Trend Deviation-Based Quantitative KPI Normalizer 1030. Processor 1002 implements a Smart Service Analyzer 1030. Smart Service Analyzer 1030 includes a Trend Deviation-Based Quantitative Key Performance Indictors (KPI) Normalizer 1040. Processor 1002 causes Trend Deviation-Based Quantitative KPIs Normalizer 1040 to normalize User Level Quantitative KPIs 1042 based on deviation from the Network Level Benchmark Trend. Normalized Quantitative KPI values 1070 are provided as an output. Processor 1002 implements passes User Level Quantitative KPIs 1042 to Cluster-Based Aggregator 1050. Aggregation is performed at the Cluster Based Aggregator 1050 because the data input is User Level data but the output is Network Level KPIs 1044. Processor 1002 applies the Variance-Based Hierarchical Clustering 1052 at Cluster-Based Aggregator 1050. Processor 1002 uses Unsupervised Machine Learning (ML) 1054 to separate the User Level Quantitative KPIs 1042 into clusters based on the variance in that data. Processor 1002 implements a KPI Averager 1056 that processes the clusters from the Variance-Based Hierarchical Clustering 1052 to determine an Average KPI value for a cluster. Processor 1002 implements a Weighted Averager 1058. Processor 1002 provides the Average KPI values for a Cluster from KPI Averager 1056 to the Weighted Averager 1058 to determine a Weighted Average of the Average KPI values based on Clustering Population. The Weight of a cluster is the Population of that cluster. Processor 1002 produces Network Level KPIs 1044 at the output of the Weighted Averager 1058. Processor 1002 aggregates the Network Level KPIs 1044 over a predetermined period of time. Processor 1002 implements ML-Based Trend Forecaster 1048. The Aggregated Quantitative KPIs at the Network Level that have been accumulated for the predetermined period of time are provided as to train the ML-Based Trend Forecaster 1048. For example, the ML-Based Trend Forecaster 1048 is able to be based on Piecewise Linear Regression or Logistic Regression 1049. ML-Based Trend Forecaster 1048 generates a Forecasted Trend 1046. Processor 1002 implements a Deviation Calculator 1060. Processor 1002 provides the Forecasted Trend 1046 to the Deviation Calculator. Processor 1002 also provides the User Level Quantitative KPI values 1064. The Deviation Calculator 1060 determines how the User Level Quantitative KPI values 1064 deviate from the Forecasted Trend 1066 at the Network Level. The Forecasted Trend 850 is considered the Benchmark Trend. The direction of deviation is based on the difference between (y) the User Level Quantitative KPI values 1064 and (y*) the Forecasted KPI Value (Forecasted Trend 1066 from the Benchmark Trend) for Network Level. In response to a trend that has an Upper Bound ($y_{upper}$) and a Lower Bound ($y_{lower}$), the ratio of that deviation is checked by the Deviation Calculator 1060. Processor 1002 uses Deviation Formulas 1068 to determine Normalized Quantitative KPIs 1070. For example, in response to the KPIs with an Upward Direction, only the Upward Deviation is considered. The Deviation Calculator 1060 determines whether y–y* is positive or negative. In response to y−y* being positive, the Normalized KPI for one user is $$\left(1 - \left\{\frac{(y - y^*)}{[N(y_{upper} - y^*)]}\right\}\right)100\%,$$

and in response to y−y* being negative, the Normalized KPI for one user is zero (0). In response to the KPIs with a Downward Direction, only the Downward Deviation is considered. The Deviation Calculator 1060 determines whether y*−y is positive or negative. In response to y*−y being positive, the Normalized KPI for one user is $$\left(1 - \left\{\frac{(y* - y)}{[N(y* - y_{lower})]}\right\}\right)100\%,$$

and in response to y*−y being negative, negative, the Normalized KPI for one user is zero (0). For KPI values with No Direction, up and downward deviation is considered. The KPI Normalization formula becomes Normalized KPI for one $$user = \left(1 - \left\{\frac{[abs(y - y^*)]}{(N[abs(y_{upper} - y_{lower})]}\right\}\right)100\%.$$

Here, the Normalized KPI is 0% or 100%. In response to abs(y−y*)=0, Processor 1002 uses Deviation Calculator 1060 to determine that the Normalized KPI is 100%. In response to abs(y−y*)≥N[abs(y$_{upper}$−y$_{lower}$)], the Processor 1002 uses Deviation Calculator 1060 to determine that the Normalized KPI is 0%, Processor 1002 provides as the output of the Deviation Calculator 1060 Normalized Quantitative KPI value 1070. Processor 1002 implements User Interface 1091 that is presented on Display 1090. User Interface 1091 is thus able to present User Level Quantitative KPIs 1092, Network Level KPIs 1093, Forecasted Trends 1094, and Normalized Quantitative KPIs 1096.

Embodiments described herein provide method that provides one or more advantages. For example, the Smart Service Analyzer provided an end-to-end automated solution. The Smart Service Analyzer is able to be used as a tool by network engineers to estimate the impact of different services at the user level and at the network level without updating logic and while adding or deleting KPIs from a service. The Smart Service Analyzer notifies stakeholders via automatic email systems while any significant deviation or change is detected in quantitative KPI trends. A KPI Normalizer normalizes User Level Qualitative KPIs and User Level Quantitative KPIs. Trend Deviation-Based Quantitative KPI Normalizer normalizes User Level Quantitative KPIs based on deviations from Network Level Benchmark Trends.

An aspect of this description is directed to a method [1] that includes receiving User Level Quantitative Key Performance Indictors (KPIs) at a Cluster Based Aggregator, performing cluster-based aggregation of the User Level Quantitative KPIs to generate Network Level Quantitative KPIs, determining a forecasted trend based on the Network Level Quantitative KPIs, and processing the User Level Quantitative KPIs by comparing against a forecasted Network Level Quantitative KPI to generate Normalized Quantitative KPIs at the User Level based on the forecasted trend; wherein the Normalized Quantitative KPIs at the User Level include a deviation from the forecasted trend.

The method described in [1], wherein the performing the cluster-based aggregation of the User Level Quantitative KPIs to generate the Network Level KPIs includes applying Variance-Based Hierarchical Clustering of the User Level Quantitative KPIs using Unsupervised Machine Learning (ML), wherein clusters of the User Level Quantitative KPIs are identified based on the variance in the User Level Quantitative KPIs.

The method described in [1] to [2], wherein the performing the cluster-based aggregation of the User Level Quantitative KPIs to generate the Network Level KPIs further includes determining Average KPI values for the clusters of the User Level Quantitative KPIs identified based on the variance in the User Level Quantitative KPIs, and determining a Weighted Average of the Average KPI values for the clusters based on a cluster population to generate the Network Level Quantitative KPIs.

The method described in [1] to [3], wherein the determining the forecasted trend based on the Network Level Quantitative KPIs includes aggregating the Network Level Quantitative KPIs for a predetermined period of time, training a Machine Learning (ML)-Based Trend Forecaster, and generating, by the Machine Learning (ML)-Based Trend Forecaster, the forecasted trend based on the training the Machine Learning (ML)-Based Trend Forecaster.

The method described in [1] to [4], wherein the processing the User Level Quantitative KPIs to generate the Normalized Quantitative KPIs at the User Level based on the forecasted trend includes determining that the User Level Quantitative KPIs have an Upward Direction, determining y−y*, wherein y is the User Level Quantitative KPI and y* is the Forecasted Trend based on the Network Level Quantitative KPIs, in response to y−y* being positive, determining the Normalized Quantitative KPI for one user is $$\left(1 - \left\{\frac{(y - y^*)}{[N(y_{upper} - y^*)]}\right\}\right)100\%,$$

where N is a predetermined number, y$_{upper}$ is +N(y*), and y$_{lower}$ is −N(y*), wherein y$_{upper}$ and y$_{lower}$ are a range of a buffer zone, and in response to y−y* being negative, determining the Normalized Quantitative KPI for one user is zero (0).

The method described in [1] to [5], wherein the processing the User Level Quantitative KPIs to generate the Normalized Quantitative KPIs at the User Level based on the forecasted trend includes determining that the User Level Quantitative KPIs have a Downward Direction, determining y*−y, wherein y is the User Level Quantitative KPI and y* is the Forecasted Trend based on the Network Level Quantitative KPIs, in response to y*−y being positive, determining the Normalized KPI for one user is $$\left(1 - \left\{\frac{(y^* - y)}{[N(y^* - y_{lower})]}\right\}\right)100\%,$$

where N is a predetermined number, y$_{upper}$ is +N(y*), and y$_{lower}$ is −N(y*), wherein y$_{upper}$ and y$_{lower}$ are a range of a buffer zone, and in response to y*−y being negative, determining the Normalized KPI for one user is zero (0).

The method described in [1] to [6], wherein the processing the User Level Quantitative KPIs to generate the Normalized Quantitative KPIs at the User Level based on the forecasted trend includes determining that the User Level Quantitative KPIs have either an Upward or a Downward Direction, in response to abs(y−y*)=0, determining the Normalized Quantitative KPI is 100%, and in response to abs(y−y*)≥N[abs($y_{upper}$−$y_{lower}$)], determining Normalized Quantitative KPI is 0%.

An aspect of this description is directed to a Trend Deviation-Based Quantitative Key Performance Indictors (KPI) Normalizer [8], including a memory storing computer-readable instructions, and a processor connected to the memory, wherein the processor is configured to execute the computer-readable instructions to perform operations to receive User Level Quantitative Key Performance Indictors (KPIs), perform cluster-based aggregation of the User Level Quantitative KPIs to generate Network Level Quantitative KPIs, determine a forecasted trend based on the Network Level Quantitative KPIs, and process the User Level Quantitative KPIs by comparing against a forecasted Network Level Quantitative KPI to generate Normalized Quantitative KPIs at the User Level based on the forecasted trend; wherein the Normalized Quantitative KPIs at the User Level include a deviation from the forecasted trend.

The Trend Deviation-Based Quantitative Key Performance Indictors (KPI) Normalizer described in [8], wherein the processor is further configured to perform the cluster-based aggregation of the User Level Quantitative KPIs to generate the Network Level KPIs by applying Variance-Based Hierarchical Clustering of the User Level Quantitative KPIs using Unsupervised Machine Learning (ML), wherein clusters of the User Level Quantitative KPIs are identified based on the variance in the User Level Quantitative KPIs.

The Trend Deviation-Based Quantitative Key Performance Indictors (KPI) Normalizer described in [8] to [9], wherein the processor is further configured to perform the cluster-based aggregation of the User Level Quantitative KPIs to generate the Network Level KPIs by further determining Average KPI values for the clusters of the User Level Quantitative KPIs identified based on the variance in the User Level Quantitative KPIs, and determining a Weighted Average of the Average KPI values for the clusters based on a cluster population to generate the Network Level Quantitative KPIs.

The Trend Deviation-Based Quantitative Key Performance Indictors (KPI) Normalizer described in [8] to [10], wherein the processor is further configured to determine the forecasted trend based on the Network Level Quantitative KPIs by aggregating the Network Level Quantitative KPIs for a predetermined period of time, training a Machine Learning (ML)-Based Trend Forecaster, and applying the trained Machine Learning (ML)-Based Trend Forecaster to generate the forecasted trend.

The Trend Deviation-Based Quantitative Key Performance Indictors (KPI) Normalizer described in [8] to [11], wherein the processor is further configured to process the User Level Quantitative KPIs to generate the Normalized Quantitative KPIs at the User Level based on the forecasted trend by determining that the User Level Quantitative KPIs have an Upward Direction, determining y−y*, wherein y is the User Level Quantitative KPI and y* is the Forecasted Trend based on the Network Level Quantitative KPIs, in response to y−y* being positive, determining the Normalized Quantitative KPI for one user is $$\left(1-\left\{\frac{(y-y^*)}{[N(y_{upper}-y^*)]}\right\}\right)100\%,$$

where N is a predetermined number, $y_{upper}$ is +N(y*), and $y_{lower}$ is −N(y*), wherein $y_{upper}$ and $y_{lower}$ are a range of a buffer zone, and in response to y−y* being negative, determining the Normalized Quantitative KPI for one user is zero (0).

The Trend Deviation-Based Quantitative Key Performance Indictors (KPI) Normalizer described in [8] to [12], wherein the processor is further configured to process the User Level Quantitative KPIs to generate the Normalized Quantitative KPIs at the User Level based on the forecasted trend by determining that the User Level Quantitative KPIs have a Downward Direction, determining y*−y, wherein y is the User Level Quantitative KPI and y* is the Forecasted Trend based on the Network Level Quantitative KPIs, in response to y*−y being positive, determining the Normalized KPI for one user is $$\left(1-\left\{\frac{(y^*-y)}{[N(y^*-y_{lower})]}\right\}\right)100\%,$$

where N is a predetermined number, $y_{upper}$ is +N(y*), and $y_{lower}$ is −N(y*), wherein $y_{upper}$ and $y_{lower}$ are a range of a buffer zone, and in response to y*−y being negative, negative, determining the Normalized KPI for one user is zero (0).

The Trend Deviation-Based Quantitative Key Performance Indictors (KPI) Normalizer described in [8] to [13], wherein the processor is further configured to process the User Level Quantitative KPIs to generate the Normalized Quantitative KPIs at the User Level based on the forecasted trend by determining that the User Level Quantitative KPIs have either an Upward or a Downward Direction, in response to abs(y−y*)=0, determining the Normalized Quantitative KPI is 100%, and in response to abs(y−y*)≥N [abs($y_{upper}$−$y_{lower}$)], determining Normalized Quantitative KPI is 0%.

An aspect of this description is directed to a non-transitory computer-readable media having computer-readable instructions stored thereon [15], which when executed by a processor causes the processor to perform operations including receiving User Level Quantitative Key Performance Indictors (KPIs) at a Cluster Based Aggregator, performing cluster-based aggregation of the User Level Quantitative KPIs to generate Network Level Quantitative KPIs, determining a forecasted trend based on the Network Level Quantitative KPIs, and processing the User Level Quantitative KPIs by comparing against a forecasted Network Level Quantitative KPI to generate Normalized Quantitative KPIs at the User Level based on the forecasted trend; wherein the Normalized Quantitative KPIs at the User Level include a deviation from the forecasted trend.

The non-transitory computer-readable media described in [15], wherein the performing the cluster-based aggregation of the User Level Quantitative KPIs to generate the Network Level KPIs includes applying Variance-Based Hierarchical Clustering of the User Level Quantitative KPIs using Unsupervised Machine Learning (ML), wherein clusters of the User Level Quantitative KPIs are identified based on the variance in the User Level Quantitative KPIs, determining Average KPI values for the clusters of the User Level Quantitative KPIs identified based on the variance in the User Level Quantitative KPIs, and determining a Weighted Average of the Average KPI values for the clusters based on a cluster population to generate the Network Level Quantitative KPIs.

The non-transitory computer-readable media described in to [16], wherein the determining the forecasted trend based on the Network Level Quantitative KPIs includes aggregating the Network Level Quantitative KPIs for a predetermined period of time, training a Machine Learning (ML)-Based Trend Forecaster, and generating, by the Machine Learning (ML)-Based Trend Forecaster, the forecasted trend based on the training the Machine Learning (ML)-Based Trend Forecaster.

The non-transitory computer-readable media described in to [17], wherein the processing the User Level Quantitative KPIs to generate the Normalized Quantitative KPIs at the User Level based on the forecasted trend includes determining that the User Level Quantitative KPIs have an Upward Direction, determining $y-y^*$, wherein y is the User Level Quantitative KPI and $y^*$ is the Forecasted Trend based on the Network Level Quantitative KPIs, in response to $y-y^*$ being positive, determining the Normalized Quantitative KPI for one user is $$\left(1 - \left\{\frac{(y - y^*)}{[N(y_{upper} - y^*)]}\right\}\right)100\%,$$

where N is a predetermined number, $y_{upper}$ is $+N(y^*)$, and $y_{lower}$ is $-N(y^*)$, wherein $y_{upper}$ and $y_{lower}$ are a range of a buffer zone, and in response to $y-y^*$ being negative, determining the Normalized Quantitative KPI for one user is zero (0).

The non-transitory computer-readable media described in to [18], wherein the processing the User Level Quantitative KPIs to generate the Normalized Quantitative KPIs at the User Level based on the forecasted trend includes determining that the User Level Quantitative KPIs have a Downward Direction, determining $y^*-y$, wherein y is the User Level Quantitative KPI and $y^*$ is the Forecasted Trend based on the Network Level Quantitative KPIs, in response to $y^*-y$ being positive, determining the Normalized KPI for one user is $$\left(1 - \left\{\frac{(y^* - y)}{[N(y^* - y_{lower})]}\right\}\right)100\%,$$

where N is a predetermined number, $y_{upper}$ is $+N(y^*)$, and $y_{lower}$ is $-N(y^*)$, wherein $y_{upper}$ and $y_{lower}$ are a range of a buffer zone, and in response to $y^*-y$ being negative, determining the Normalized KPI for one user is zero (0).

The non-transitory computer-readable media described in to [19], wherein the processing the User Level Quantitative KPIs to generate the Normalized Quantitative KPIs at the User Level based on the forecasted trend includes determining that the User Level Quantitative KPIs have either an Upward or a Downward Direction, in response to $abs(y-y^*)=0$, determining the Normalized Quantitative KPI is 100%, and in response to $abs(y-y^*) \geq N[abs(y_{upper}-y_{lower})]$, determining Normalized Quantitative KPI is 0%.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method, comprising:
    receiving User Level Quantitative Key Performance Indictors (KPIs) at a Cluster Based Aggregator;
    performing cluster-based aggregation of the User Level Quantitative KPIs to generate Network Level Quantitative KPIs;
    determining a forecasted trend of the Network Level Quantitative KPIs based on the Network Level Quantitative KPIs; and
    in response to the User Level Quantitative KPIs being within a range of performance thresholds, processing the User Level Quantitative KPIs to generate Normalized Quantitative KPIs at the User Level by comparing against a forecasted Network Level Quantitative KPI based on the forecasted trend of the Network Level Quantitative KPIs; wherein the Normalized Quantitative KPIs at the User Level include a deviation from the forecasted trend.

2. The method of claim 1, wherein the performing the cluster-based aggregation of the User Level Quantitative KPIs to generate the Network Level KPIs includes applying Variance-Based Hierarchical Clustering of the User Level Quantitative KPIs using Unsupervised Machine Learning (ML), wherein clusters of the User Level Quantitative KPIs are identified based on the variance in the User Level Quantitative KPIs.

3. The method of claim 2, wherein the performing the cluster-based aggregation of the User Level Quantitative KPIs to generate the Network Level KPIs further includes:
    determining Average KPI values for the clusters of the User Level Quantitative KPIs identified based on the variance in the User Level Quantitative KPIs; and
    determining a Weighted Average of the Average KPI values for the clusters based on a cluster population to generate the Network Level Quantitative KPIs.

4. The method of claim 1, wherein the determining the forecasted trend based on the Network Level Quantitative KPIs includes:
    aggregating the Network Level Quantitative KPIs for a predetermined period of time;
    training a Machine Learning (ML)-Based Trend Forecaster; and
    generating, by the Machine Learning (ML)-Based Trend Forecaster, the forecasted trend based on the training the Machine Learning (ML)-Based Trend Forecaster.

5. The method of claim 1, wherein the processing the User Level Quantitative KPIs to generate the Normalized Quantitative KPIs at the User Level based on the forecasted trend includes:
    determining the User Level Quantitative KPIs have an Upward Direction;
    determining $y-y^*$, wherein y is the User Level Quantitative KPIs and $y^*$ is the Forecasted Trend based on the Network Level Quantitative KPIs;

in response to y−y* being positive, determining the Normalized Quantitative KPI for one user is $$\left(1 - \left\{\frac{(y - y^*)}{[N(y_{upper} - y^*)]}\right\}\right)100\%,$$

where N is a predetermined number, $y_{upper}$ is $+N(y^*)$, and $y_{lower}$ is $-N(y^*)$, wherein $y_{upper}$ and $y_{lower}$ are a range of a buffer zone; and in response to y−y* being negative, determining the Normalized Quantitative KPI for one user is zero (0).

6. The method of claim 1, wherein the processing the User Level Quantitative KPIs to generate the Normalized Quantitative KPIs at the User Level based on the forecasted trend includes:

determining that the User Level Quantitative KPIs have a Downward Direction;

determining y*−y, wherein y is the User Level Quantitative KPI and y* is the Forecasted Trend based on the Network Level Quantitative KPIs;

in response to y*−y being positive, determining the Normalized KPI for one user is $$\left(1 - \left\{\frac{(y^* - y)}{[N(y^* - y_{lower})]}\right\}\right)100\%,$$

where N is a predetermined number, $y_{upper}$ is $+N(y^*)$, and $y_{lower}$ is $-N(y^*)$, wherein $y_{upper}$ and $y_{lower}$ are a range of a buffer zone; and in response to y*−y being negative, determining the Normalized KPI for one user is zero (0).

7. The method of claim 1, wherein the processing the User Level Quantitative KPIs to generate the Normalized Quantitative KPIs at the User Level based on the forecasted trend includes:

determining that the User Level Quantitative KPIs have either an Upward or a Downward Direction;

in response to abs(y−y*)=0, wherein y is the User Level Quantitative KPI and y* is the Forecasted Trend based on the Network Level Quantitative KPIs, determining the Normalized Quantitative KPI is 100%; and in response to abs(y−y*)≥N[abs($y_{upper}$−$y_{lower}$)], where N is a predetermined number, $y_{upper}$ is $+N(y^*)$, and $y_{lower}$ is $-N(y)$, wherein $y_{upper}$ and $y_{lower}$ are a range of a buffer zone, determining the Normalized Quantitative KPI is 0%.

8. The method of claim 1, wherein the processing the User Level Quantitative KPIs to generate the Normalized Quantitative KPIs at the User Level based on the forecasted trend includes:

determining a direction of variation of the User Level Quantitative KPIs;

calculating a difference between an actual User Level Quantitative KPI (y) and a forecasted benchmark trend value (y*) based on the Network Level Quantitative KPIs; and determining, based on the determined direction of variation and the calculated difference, a Normalized Quantitative KPI per user.

9. A Trend Deviation-Based Quantitative Key Performance Indicator (KPI) Normalizer, comprising:

a memory storing computer-readable instructions; and a processor connected to the memory, wherein the processor is configured to execute the computer-readable instructions to perform operations to:

receive User Level Quantitative Key Performance Indictors (KPIs);

perform cluster-based aggregation of the User Level Quantitative KPIs to generate Network Level Quantitative KPIs;

determine a forecasted trend of the Network Level Quantitative KPIs based on the Network Level Quantitative KPIs; and in response to the User Level Quantitative KPIs being within a range of performance thresholds, process the User Level Quantitative KPIs by comparing against a forecasted Network Level Quantitative KPI to generate Normalized Quantitative KPIs at the User Level based on the forecasted trend of the Network Level Quantitative KPIs; wherein the Normalized Quantitative KPIs at the User Level include a deviation from the forecasted trend.

10. The Trend Deviation-Based Quantitative KPI Normalizer of claim 9, wherein the processor is further configured to perform the cluster-based aggregation of the User Level Quantitative KPIs to generate the Network Level KPIs by applying Variance-Based Hierarchical Clustering of the User Level Quantitative KPIs using Unsupervised Machine Learning (ML), wherein clusters of the User Level Quantitative KPIs are identified based on the variance in the User Level Quantitative KPIs.

11. The Trend Deviation-Based Quantitative KPI Normalizer of claim 10, wherein the processor is further configured to perform the cluster-based aggregation of the User Level Quantitative KPIs to generate the Network Level KPIs by further determining Average KPI values for the clusters of the User Level Quantitative KPIs identified based on the variance in the User Level Quantitative KPIs, and determining a Weighted Average of the Average KPI values for the clusters based on a cluster population to generate the Network Level Quantitative KPIs.

12. The Trend Deviation-Based Quantitative KPI Normalizer of claim 9, wherein the processor is further configured to determine the forecasted trend based on the Network Level Quantitative KPIs by:

aggregating the Network Level Quantitative KPIs for a predetermined period of time;

training a Machine Learning (ML)-Based Trend Forecaster; and applying the trained Machine Learning (ML)-Based Trend Forecaster to generate the forecasted trend.

13. The Trend Deviation-Based Quantitative KPI Normalizer of claim 9, wherein the processor is further configured to process the User Level Quantitative KPIs to generate the Normalized Quantitative KPIs at the User Level based on the forecasted trend by:

determining that the User Level Quantitative KPIs have an Upward Direction;

determining y−y*, wherein y is the User Level Quantitative KPI and y* is the Forecasted Trend based on the Network Level Quantitative KPIs;

in response to y−y* being positive, determining the Normalized Quantitative KPI for one user is $$\left(1 - \left\{\frac{(y - y^*)}{[N(y_{upper} - y^*)]}\right\}\right)100\%,$$

where N is a predetermined number, $y_{upper}$ is +N(y*), and $y_{lower}$ is −N(y*), wherein $y_{upper}$ and $y_{lower}$ are a range of a buffer zone; and in response to y−y* being negative, determining the Normalized Quantitative KPI for one user is zero (0).

14. The Trend Deviation-Based Quantitative KPI Normalizer of claim 9, wherein the processor is further configured to process the User Level Quantitative KPIs to generate the Normalized Quantitative KPIs at the User Level based on the forecasted trend by:

determining that the User Level Quantitative KPIs have a Downward Direction;

determining y*−y, wherein y is the User Level Quantitative KPI and y* is the Forecasted Trend based on the Network Level Quantitative KPIs;

in response to y*−y being positive, determining the Normalized KPI for one user is $$\left(1 - \left\{\frac{(y^* - y)}{[N(y^* - y_{lower})]}\right\}\right)100\%,$$

where N is a predetermined number, $y_{upper}$ is +N(y*), and $y_{lower}$ is −N(y*), wherein $y_{upper}$ and $y_{lower}$ are a range of a buffer zone; and in response to y*−y being negative, negative, determining the Normalized KPI for one user is zero (0).

15. The Trend Deviation-Based Quantitative KPI Normalizer of claim 9, wherein the processor is further configured to process the User Level Quantitative KPIs to generate the Normalized Quantitative KPIs at the User Level based on the forecasted trend by:

determining that the User Level Quantitative KPIs have either an Upward or a Downward Direction;

in response to abs(y−y*)=0, wherein y is the User Level Quantitative KPI and y* is the Forecasted Trend based on the Network Level Quantitative KPIs, determining the Normalized Quantitative KPI is 100%; and in response to abs(y−y*)≥N[abs($y_{upper}$−$y_{lower}$)], where N is a predetermined number, $y_{upper}$ is +N(y*), and $y_{lower}$ is −N(y*), wherein $y_{upper}$ and $y_{lower}$ are a range of a buffer zone, determining Normalized Quantitative KPI is 0%.

16. The Trend Deviation-Based Quantitative KPI Normalizer of claim 9, wherein the processor is further configured to process the User Level Quantitative KPIs to generate Normalized Quantitative KPIs at the User Level based on the forecasted trend by:

determining a direction of variation of the User Level Quantitative KPIs;

calculating a difference between an actual User Level Quantitative KPI (y) and a forecasted benchmark trend value (y*) based on the Network Level Quantitative KPIs; and determining, based on the determined direction of variation and the calculated difference, a Normalized Quantitative KPI per user.

17. A non-transitory computer-readable media having computer-readable instructions stored thereon, which when executed by a processor causes the processor to perform operations comprising:

receiving User Level Quantitative Key Performance Indictors (KPIs) at a Cluster Based Aggregator;

performing cluster-based aggregation of the User Level Quantitative KPIs to generate Network Level Quantitative KPIs;

determining a forecasted trend based of the Network Level Quantitative KPIs on the Network Level Quantitative KPIs; and in response to the User Level Quantitative KPIs being within a range of performance thresholds, processing the User Level Quantitative KPIs by comparing against a forecasted Network Level Quantitative KPI to generate Normalized Quantitative KPIs at the User Level based on the forecasted trend of the Network Level Quantitative KPIs; wherein the Normalized Quantitative KPIs at the User Level include a deviation from the forecasted trend.

18. The non-transitory computer-readable media of claim 17, wherein the performing the cluster-based aggregation of the User Level Quantitative KPIs to generate the Network Level KPIs includes:

applying Variance-Based Hierarchical Clustering of the User Level Quantitative KPIs using Unsupervised Machine Learning (ML), wherein clusters of the User Level Quantitative KPIs are identified based on the variance in the User Level Quantitative KPIs;

determining Average KPI values for the clusters of the User Level Quantitative KPIs identified based on the variance in the User Level Quantitative KPIs; and determining a Weighted Average of the Average KPI values for the clusters based on a cluster population to generate the Network Level Quantitative KPIs.

19. The non-transitory computer-readable media of claim 17, wherein the determining the forecasted trend based on the Network Level Quantitative KPIs includes:

aggregating the Network Level Quantitative KPIs for a predetermined period of time;

training a Machine Learning (ML)-Based Trend Forecaster; and generating, by the Machine Learning (ML)-Based Trend Forecaster, the forecasted trend based on the training the Machine Learning (ML)-Based Trend Forecaster.

20. The non-transitory computer-readable media of claim 17, wherein the processing the User Level Quantitative KPIs to generate the Normalized Quantitative KPIs at the User Level based on the forecasted trend includes:

determining that the User Level Quantitative KPIs have an Upward Direction;

determining y−y*, wherein y is the User Level Quantitative KPI and y* is the Forecasted Trend based on the Network Level Quantitative KPIs;

in response to y−y* being positive, determining the Normalized Quantitative KPI for one user is $$\left(1 - \left\{\frac{(y - y^*)}{[N(y_{upper} - y^*)]}\right\}\right)100\%,$$

where N is a predetermined number, $y_{upper}$ is +N(y*), and $y_{lower}$ is −N(y*), wherein $y_{upper}$ and $y_{lower}$ are a range of a buffer zone; and in response to y−y* being negative, determining the Normalized Quantitative KPI for one user is zero (0).

21. The non-transitory computer-readable media of claim 17, wherein the processing the User Level Quantitative KPIs to generate the Normalized Quantitative KPIs at the User Level based on the forecasted trend includes:

determining that the User Level Quantitative KPIs have a Downward Direction;

determining y*−y, wherein y is the User Level Quantitative KPI and y* is the Forecasted Trend based on the Network Level Quantitative KPIs;

in response to y*−y being positive, determining the Normalized KPI for one user is $$\left(1 - \left\{\frac{(y^* - y)}{[N(y^* - y_{lower})]}\right\}\right)100\%,$$

where N is a predetermined number, $y_{upper}$ is $+N(y^*)$, and $y_{lower}$ is $-N(y^*)$, wherein $y_{upper}$ and $y_{lower}$ are a range of a buffer zone; and in response to y*−y being negative, determining the Normalized KPI for one user is zero (0).

22. The non-transitory computer-readable media of claim 17, wherein the processing the User Level Quantitative KPIs to generate the Normalized Quantitative KPIs at the User Level based on the forecasted trend includes:

determining that the User Level Quantitative KPIs have either an Upward or a Downward Direction;

in response to abs(y−y*)=0, wherein y is the User Level Quantitative KPI and y* is the Forecasted Trend based on the Network Level Quantitative KPIs, determining the Normalized Quantitative KPI is 100%; and in response to abs(y−y*)≥N[abs($y_{upper}$−$y_{lower}$)], where N is a predetermined number, $y_{upper}$ is $+N(y^*)$, and $y_{lower}$ is $-N(y)$, wherein $y_{upper}$ and $y_{lower}$ are a range of a buffer zone, determining Normalized Quantitative KPI is 0%.

23. The non-transitory computer-readable media of claim 17, wherein the processing the User Level Quantitative KPIs to generate Normalized Quantitative KPIs at the User Level based on the forecasted trend includes:

determining a direction of variation of the User Level Quantitative KPIs;

calculating a difference between an actual User Level Quantitative KPI (y) and a forecasted benchmark trend value (y*) based on the Network Level Quantitative KPIs; and determining, based on the determined direction of variation and the calculated difference, a Normalized Quantitative KPI per user.

* * * * *